United States Patent
Hole et al.

(10) Patent No.: US 10,757,616 B2
(45) Date of Patent: Aug. 25, 2020

(54) GEOGRAPHICALLY-ORGANIZED NEIGHBOR CELL LISTS

(71) Applicant: BlackBerry Limited, Waterloo (CA)

(72) Inventors: David Philip Hole, Southampton (GB); Stephen McCann, Southampton (GB); Maiyuran Wijayanathan, Waterloo (CA); Andrew Mark Earnshaw, Kanata (CA)

(73) Assignee: BlackBerry Limited, Waterloo, Ontario (CA)

( * ) Notice: Subject to any disclaimer, the term of this patent is extended or adjusted under 35 U.S.C. 154(b) by 60 days.

(21) Appl. No.: 15/266,694

(22) Filed: Sep. 15, 2016

(65) Prior Publication Data

US 2017/0006512 A1    Jan. 5, 2017

Related U.S. Application Data

(62) Division of application No. 13/921,081, filed on Jun. 18, 2013, now Pat. No. 9,451,513.

(51) Int. Cl.
*H04W 36/00* (2009.01)
*H04W 36/08* (2009.01)
*H04W 36/36* (2009.01)

(52) U.S. Cl.
CPC ... *H04W 36/0094* (2013.01); *H04W 36/0061* (2013.01); *H04W 36/0083* (2013.01); *H04W 36/08* (2013.01); *H04W 36/36* (2013.01)

(58) Field of Classification Search
CPC . H04W 24/10; H04W 24/02; H04W 36/0055; H04W 24/08; H04W 36/14; H04W 8/16; H04W 92/12; H04W 64/00; H04W 48/20; H04W 36/08; H04L 12/5865; H04B 17/309; G01S 5/0236; G01S 5/0027

USPC .............................. 455/436–444, 456.1–457
See application file for complete search history.

(56) References Cited

U.S. PATENT DOCUMENTS

| 8,380,200 | B1 | 2/2013 | Spitzer et al. | |
|---|---|---|---|---|
| 2011/0116462 | A1* | 5/2011 | Zhou | H04L 5/0053 370/329 |
| 2011/0124361 | A1 | 5/2011 | Hosono et al. | |
| 2011/0134834 | A1 | 6/2011 | Yang | |
| 2011/0217989 | A1 | 9/2011 | Fodor et al. | |
| 2011/0280144 | A1* | 11/2011 | Mohseni | H04W 52/0245 370/252 |

(Continued)

FOREIGN PATENT DOCUMENTS

| EP | 1089581 | 4/2001 |
|---|---|---|
| EP | 1422959 | 5/2004 |
| WO | 2011/022731 | 2/2011 |

OTHER PUBLICATIONS

Access Network Discovery and Selection Function (http://en.wikipedia.org/w/index.php?title=Access_network_discovery_and_selection_function&oldid=549529986); last modified on Apr. 9, 2013 and retrieved Apr. 10, 2013.

(Continued)

*Primary Examiner* — Allahyar Kasraian
(74) *Attorney, Agent, or Firm* — Fish & Richardson P.C.

(57) ABSTRACT

Communication network techniques may use geographic information to reduce a number of neighboring cell measurements to be taken. Such techniques may be useful, for example, in cell reselection.

16 Claims, 16 Drawing Sheets

(56) References Cited

U.S. PATENT DOCUMENTS

| | | | | |
|---|---|---|---|---|
| 2012/0129567 A1* | 5/2012 | Kimura | ............... | H04W 52/244 |
| | | | | 455/522 |
| 2012/0157117 A1 | 6/2012 | Choi et al. | | |
| 2012/0195290 A1* | 8/2012 | Bienas | ................. | H04W 24/10 |
| | | | | 370/332 |
| 2013/0122909 A1* | 5/2013 | Takahashi | ............. | H04W 24/10 |
| | | | | 455/436 |
| 2013/0155896 A1* | 6/2013 | Lim | ................. | H04W 52/0206 |
| | | | | 370/252 |
| 2013/0260769 A1 | 10/2013 | Marce et al. | | |
| 2014/0162656 A1* | 6/2014 | Chai | .................... | H04W 48/16 |
| | | | | 455/437 |
| 2014/0204908 A1* | 7/2014 | Keller | ............... | H04W 36/0022 |
| | | | | 370/331 |
| 2014/0315559 A1 | 10/2014 | To | | |

OTHER PUBLICATIONS

Extended European Search report issued in European Application No. 14168852.3 dated Feb. 10, 2015 (10 pages).
Communication Pursuant to Article 94(3) EPC issued in European Application No. 14168852.3 dated Aug. 4, 2017; 4 pages.
Invitation Pursuant to Article 94(3) EPC and Rule 71(1) EPC issued in European Application No. 14168852.3 dated Feb. 2, 2017; 5 pages.
Communication under Rule 71(3) EPC issued in European Application No. 14168852.3 dated Mar. 15, 2018, 7 pages.

* cited by examiner

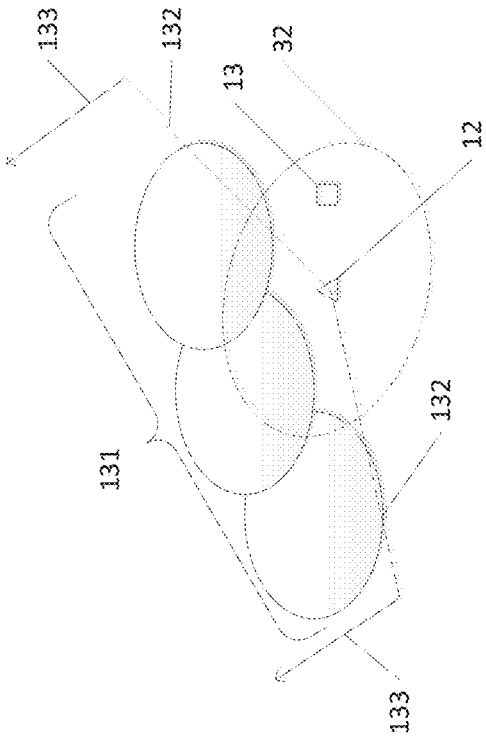
FIG. 13A
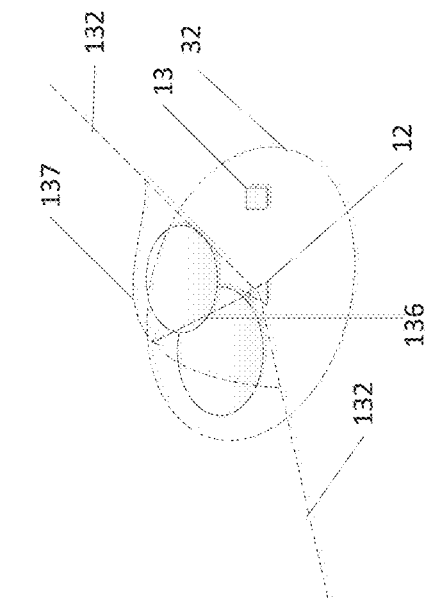
FIG. 13B
FIG. 13C
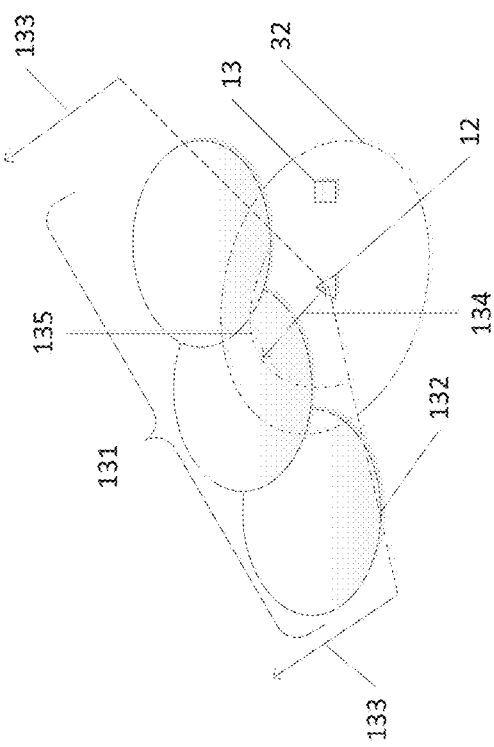
FIG. 13D

GEOGRAPHICALLY-ORGANIZED NEIGHBOR CELL LISTS

CROSS REFERENCE TO RELATED APPLICATION

This patent is a divisional of U.S. Non-Provisional application Ser. No. 13/921,081, filed Jun. 18, 2013, the entire contents of which is hereby expressly incorporated by reference herein in its entirety.

FIELD OF ENDEAVOR

Various aspects of this disclosure may address techniques for use in communication networks.

BACKGROUND

In many communication networks, e.g., wireless communication networks, neighbor cell lists may be used by terminals to identify cells for which measurements are to be performed. Such measurements may include, for example, signal strength measurements, but are not thus limited. Such measurements may be used for, e.g., cell reselection, handover, cell change order, etc., and may be used by the terminal by the network or by both.

In many communication networks, a neighbor cell list (NCL) may be provided by the network, e.g., via a serving cell (but not necessarily limited thereto), to the terminal (which may be a mobile terminal, such as a handheld telephony device, personal digital assistant (PDA), personal computer (PC), mobile computing device (MCD), electronic book reader (e-reader), or the like, but which is not necessarily limited to mobile terminals), and the terminal may then make measurements of cells in the NCL (which may, in at least some cases, be reported to the network). The terminal may often be required to obtain measurements of all cells in the NCL. If there are a large number of cells in the NCL, a number of issues may arise, including: (1) a given cell may be measured less frequently than is desirable, which may result in less accurate measurements; (2) measurements of a given cell by the terminal may become stale (no longer accurate) due to movement of the terminal; (3) measurements may be made for cells that are not realistic candidates for cell reselection or handover; or (4) excessive battery drain in the case of battery-powered terminals, due to large numbers of measurements being required. These issues may be compounded by the co-existence of radio access networks using different access technologies, which may require that terminals compatible with more than one of the radio access technologies make cell measurements for cells of the co-existing radio access networks. These issues by further be compounded by the existence of smaller cells (e.g., "femtocells," but not limited thereto), which may result in overlapping cell ranges, more cells in a given area, or both, any of which circumstances may increase the number of cells for measurement.

BRIEF DESCRIPTION OF THE DRAWINGS

Various aspects of this disclosure will now be described in conjunction with the accompanying drawings, in which:

FIG. 13, which includes FIGS. 13A-13D, depicts various examples of cases in which geographical knowledge may be used where measurements may be based on carrier frequencies;

DETAILED DESCRIPTION

Figure 1:
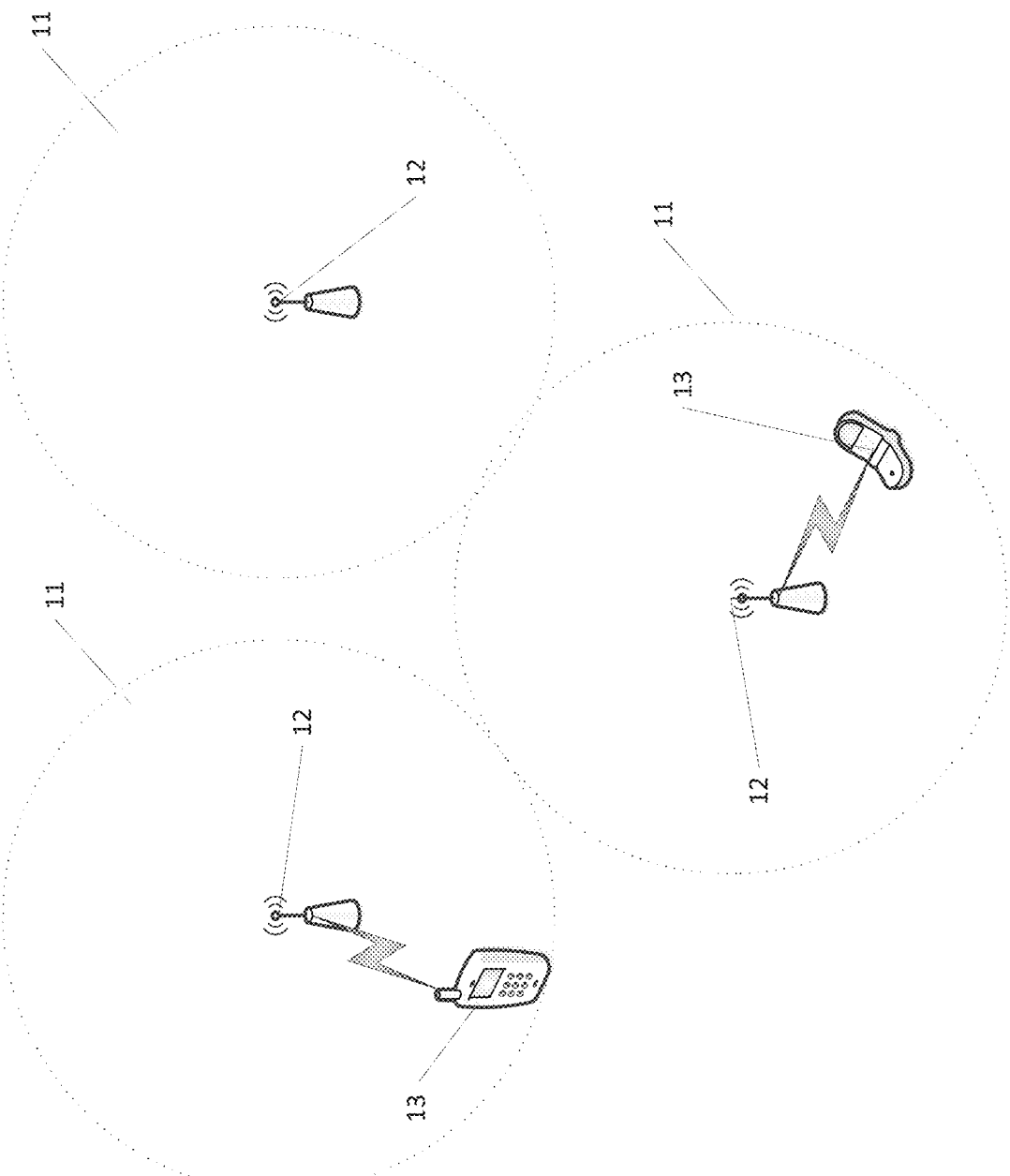
FIG. 1 shows an example of a communication network in which various techniques disclosed herein may be used.

FIG. 1 shows a conceptual drawing of a communication network in which various techniques disclosed herein may be used. A network may include one or multiple cells 11. A respective cell may have an associated base station 12, which communicates with various terminals 13 in the respective cell 11. In general, a terminal 13 may be a communication device capable of communication via the communication network; as discussed above, a terminal (or "mobile" or "mobile station" or "user equipment (UE)," for example) may be a mobile terminal, such as a smartphone, PDA, PC, e-reader, etc. A base station 12 may generally be thought of as a portion of the communication network that communicates with terminals 13; base stations may also be referred to, for example, as "bases," "NodeBs," e-NodeBs," "access points," etc. In this disclosure, "cell" is used generically to refer to a coverage area; therefore, the term, "cells," may include, for example, "macrocells," "microcells," "nanocells," "femtocells," "picocells," etc.

Figure 2:
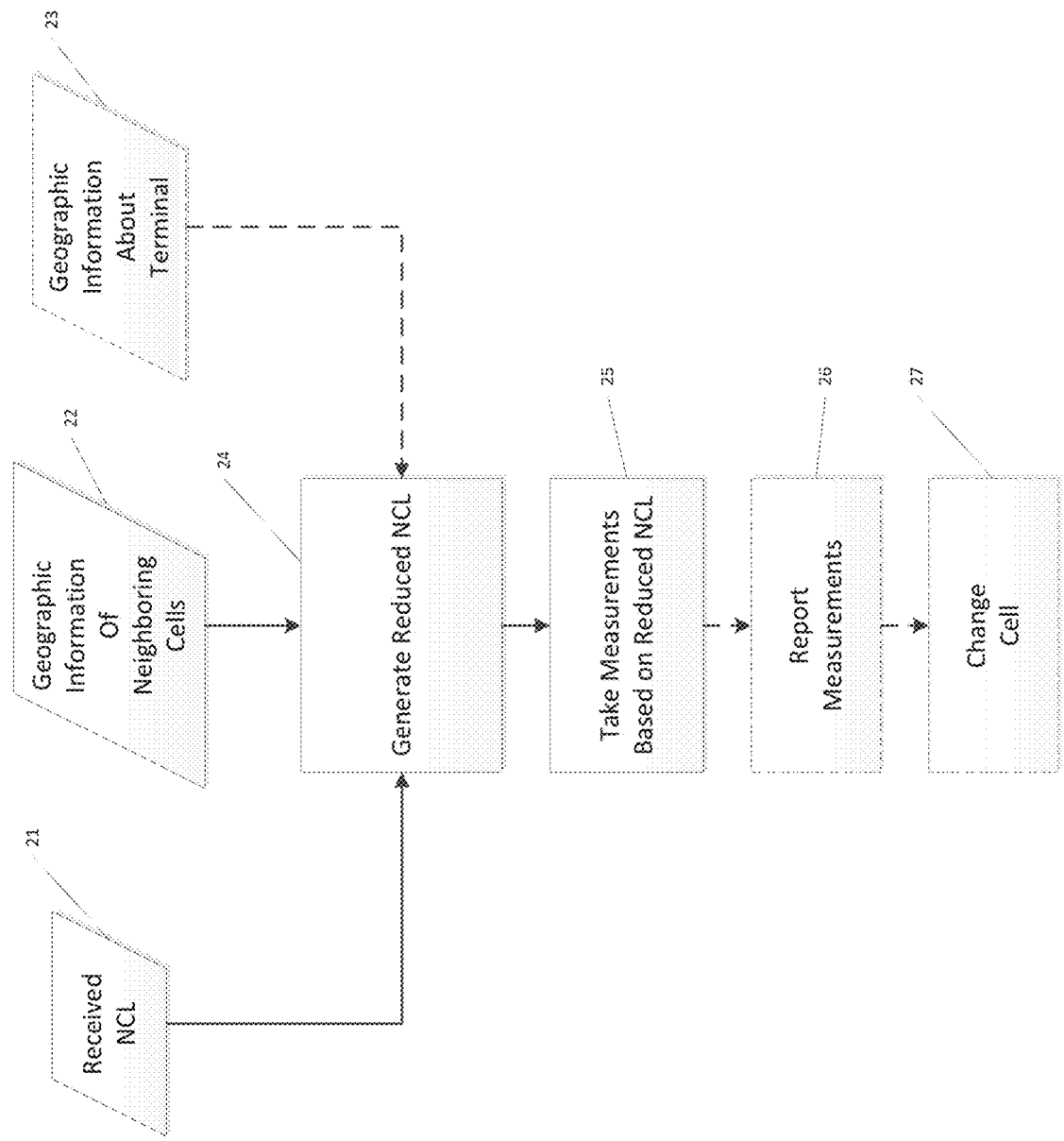
FIG. 2 shows a flow diagram of a technique that may be used according aspects of this disclosure.

FIG. 2 shows an overall flow diagram of an illustrative example process that may be performed at a terminal 13 in a communication network. The terminal 13 may receive a neighbor cell list 21, e.g., from a base station 12 of a serving cell 11 ("serving cell" is used here to denote a cell 11 that is primarily responsible for communications with the particular terminal 13). The terminal 13 may also receive or otherwise ascertain geographic information associated with one or more of the neighboring cells in the NCL 22; this information may be received, e.g., from the network, with the NCL 21 or separately from the NCL 21. Additionally, geographic information may also be ascertained 23 regarding the terminal 13. The aforementioned information (NCL 21, geographic information relating to the NCL 22, and, optionally, geographic information about the terminal 23) may be used to generate a reduced NCL 24. The reduced NCL may then be used to take measurements 25, which may serve to thus reduce the number of cells being measured. The resulting measurements may optionally be reported to the network 26, e.g., but not limited to, via the base station 12 associated with the serving cell 11 of the terminal 13. Also, optionally, the measurement information may be used in changing the serving cell of the terminal 13 to a new serving cell (e.g., by means of cell reselection, network-assisted cell change, handover, cell change order, redirection, etc.) 27, which may be either under network control, or which may be done autonomously, by the terminal 13.

The reduced NCL may be formed in a number of ways, some of which will be discussed further below. In general, a reduced NCL may be formed based on an NCL by eliminating neighboring cells, adjusting frequencies with which some neighboring cells may be measured, or both. That is, the reduced NCL may be literally "reduced" (i.e., in number of cells) or may be "reduced" in the sense of reducing frequencies of measurement, or both.

According to a first aspect of this technique, the geographical information of the neighboring cells of the NCL 22 may be provided to the terminal 13 by the network, as discussed above. This information may otherwise be determined by the terminal 13, e.g., based on signals transmitted by the various base stations 12 of the various cells 11. For example, the base stations 12 may transmit their individual locations. According to another example, a terminal 13 may receive or know the geographical locations of a subset of the cells in the NCL and may be able to ascertain locations of other cells in the NCL based on strengths, directions, or both, of signals transmitted by the other cell (e.g., using triangulation or other known location determining techniques). It is to be understood that signals transmitted by a cell may be transmitted by one or more base stations within the cell.

The "location of a cell" may refer to a number of different concepts. "Location of a cell" may refer to a coverage area of a cell, a location of a base station associated with the cell, or some other reference point within the cell, for example. Further details of how "location" may be defined in different scenarios will be discussed below.

In some example implementations, locations may be determined in absolute terms, such as latitude, longitude, height, etc. In some implementations, locations may be determined relative to a particular (fixed or moving) point, such as, for example, direction, distance, or both, relative to the particular point. Such a particular point may be, e.g., a location of a given terminal 13 or base station 12. In some implementations, locations may be determined in approximate terms, such as by a sector, relative to a particular point, or distance range, relative to a particular point, or both. Distances may, in some cases, be determined or approximated based on received signal strength, transmitted signal strength, or both.

In generating the reduced NCL 24, it may be advantageous to include in the reduced NCL cells 11 that are, according to some criterion, considered to be "nearby." The reduced NCL may, in one example, include only those cells 11 of the NCL that are within some predetermined distance of the terminal 13 (which may be, for example, determined based on the locations of base stations 12 associated with cells 11).

In a modification of the above concept, knowledge of the transmit power (or other indication of coverage) of a particular cell 11 may be considered in the above determination. Such additional information may, e.g., be broadcast by a base station 12 of the cell 11, e.g., in system information, be determined or constrained by regulatory considerations, etc. This information may be combined with either the location information or may, equivalently, be used to modify the threshold values used in making the above determinations.

Figure 3:
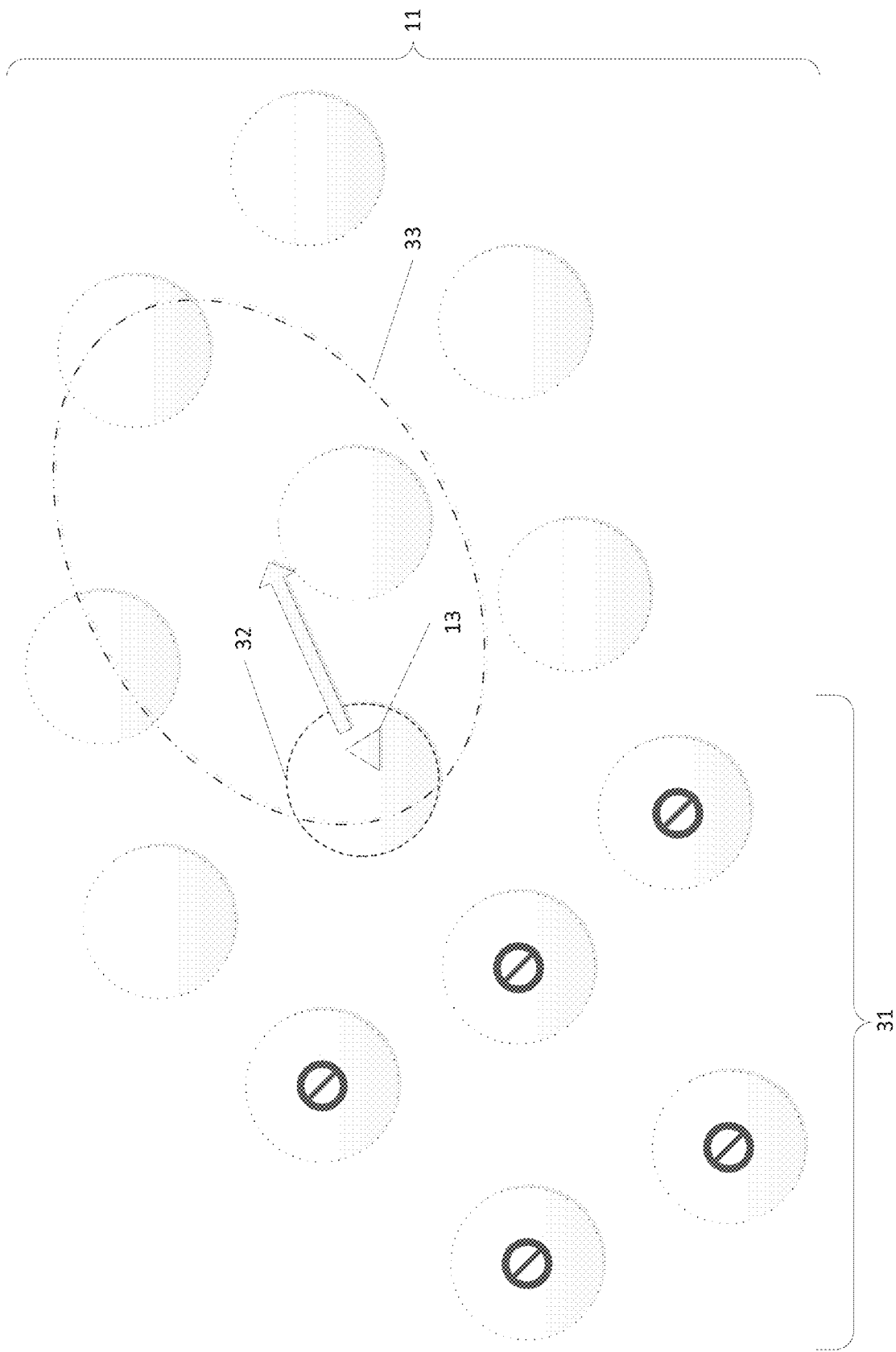
FIG. 3 shows an example of a network in which a terminal may be moving among cells.

In some implementations, motion of the terminal 13 may be taken into account. This may be used to further reduce the number of neighbor cells in the reduced NCL. In particular, if the terminal 13 is moving in a direction away from a given cell 11, it is less likely that the given cell 11 will continue to be relevant, and therefore, it may be a waste of resources to perform measurements on that cell 11. FIG. 3 shows an example of such a situation. Terminal 13 is shown in a current serving cell 32 and is moving in the direction shown by the arrow. The cells received by the terminal 13 in the NCL may include all of the cells 11. However, because terminal 13 is moving away from the group of cells 31 (shown with the "no" symbol, i.e., the circle with the slash through it), it is unlikely that the terminal will use one of cells 31 for communication. Therefore, the terminal 13 may eliminate cells 31 from the NCL in generating the reduced NCL. In a variation, this may be done along with eliminating (from the reduced NCL) any cells that are farther away than the predetermined threshold(s), as discussed above.

Similarly, the terminal 13 may also opt not to eliminate from the reduced NCL some cells 11 that may be farther away than the predetermined threshold(s) would normally indicate should be in the reduced NCL, but which are in a direction of motion of the terminal 13, and which thus may be possible future handover candidates, for example. As an example of such a case, the terminal 13 may opt to leave in the reduced NCL the cells 11 that fall within the region defined by an ellipse 33; it is noted, however, that the shape of such a region is not thus limited, and there may be many ways to define such a region.

As noted above, positions of cells 11 may be absolute (e.g., in longitude and latitude) or relative. One example of a relative indication of cell positions may be radial direction (e.g., distance and bearing) relative to a terminal 13 or to a serving cell 32. Some potential benefits to using radial direction information in the NCL are that it may take fewer communication resources to send such information to a terminal 13 (in comparison with absolute location information, such as longitude, latitude and height) and that it may take up less memory space in terminal 13.

Figure 4:
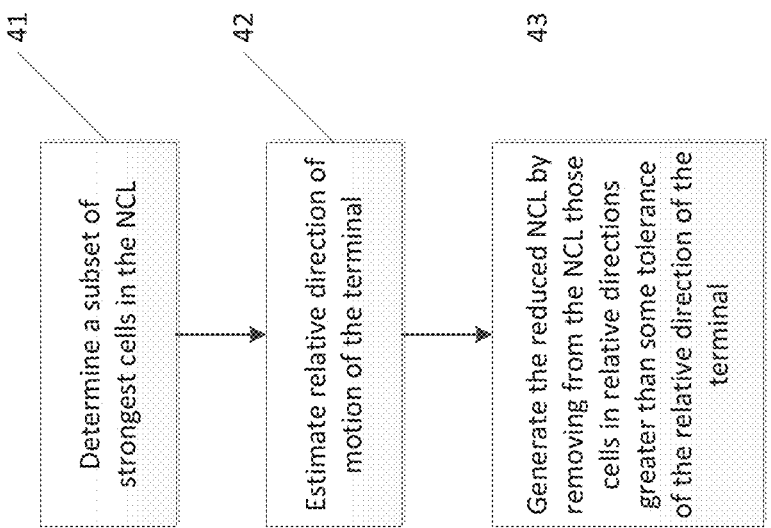
FIG. 4 shows an example of a flow diagram of a variation of a technique according to an aspect of this disclosure.
Figure 5:
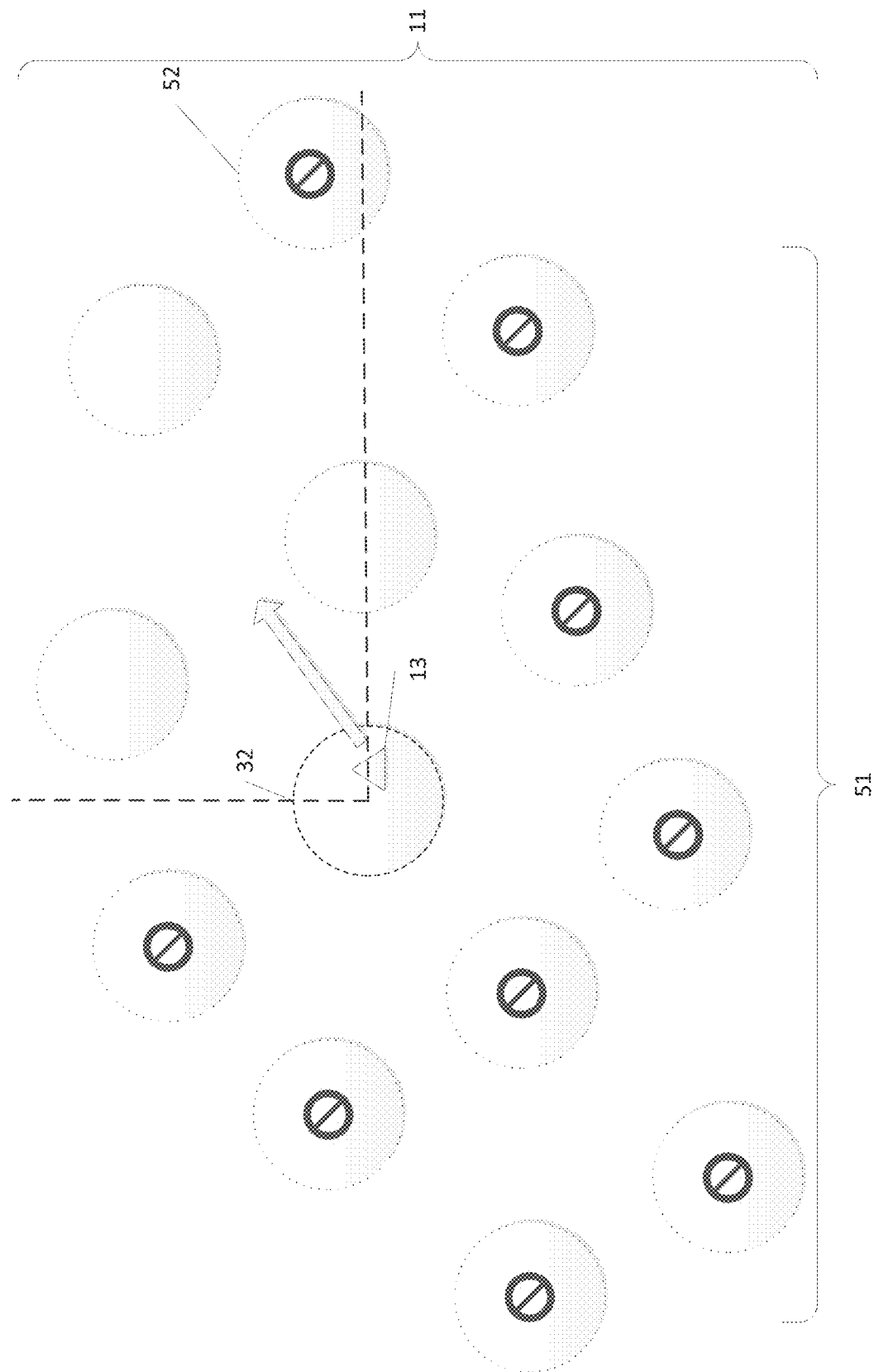
FIG. 5 shows a pictorial example of how the technique of FIG. 4 may be used.
Figure 6:
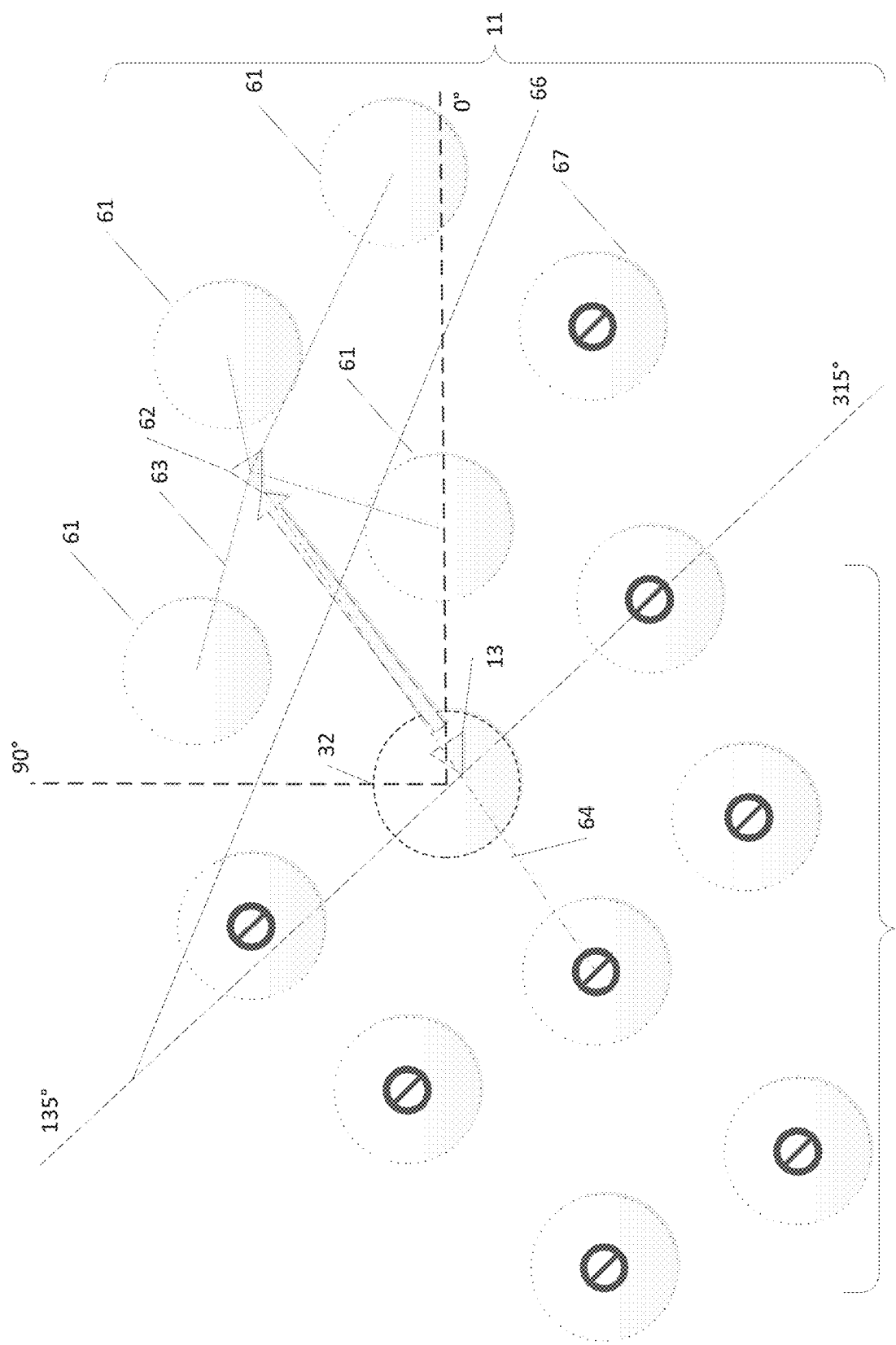
FIG. 6 shows a further pictorial example of a variation of how the technique of FIG. 4 may be used.

FIGS. 4-6 show examples of how radial direction may be used, according to some disclosed techniques, to reduce the NCL. The terminal 13 may initially determine a subset of strongest cells in the NCL 41. This may be done, e.g., by taking measurements of all cells in the NCL. The terminal 13 may then estimate its relative direction of motion 42; this may be done with respect to the (center of the) serving cell 32, for example. One technique for doing this may be to obtain the relative direction based on cell measurement information. For example, one way, among other possibilities, in which one may estimate the relative direction of the terminal 13 may be based on relative directions of the strongest measured cells (e.g., using a mean, weighted average, or median); however, the disclosed techniques are not thus limited.

The terminal 13 may then generate the reduced NCL 43 by removing cells from the NCL based on both relative direction and measurements. According to one example, as shown in FIG. 5, the terminal 13 may consider only cells 11 located within a sector defined by a 90° region surrounding the terminal's direction of motion, determined relative to the center of serving cell 32; however, these techniques are not limited to a 90° region, and other regions may be used (additionally, angular measurements are not limited to degrees and may be in other units, such as, but not limited to, radians or steradians). Simply excluding the cells that do not fall within the region defined by the two dashed lines shown in FIG. 5 eliminates all of the cells 51 shown with the "no" symbol. Based on measurement information, terminal 13 may further decide that one or more cells, such as cell 52, have weak measurements and are, therefore, unlikely to be useful, e.g., for handover purposes. Therefore, cell 52 may also be eliminated in generating the reduced NCL, as denoted by the "no" symbol shown therein.

It is also possible that, for example, terminal 13 may be able to determine or approximate an absolute location for the serving cell 32. For example, if the terminal 13 or a base station 12 associated with serving cell 32 has satellite positioning capabilities (e.g., GNSS), the terminal 13 or base station 12 may be able to obtain an absolute location, which may be used in lieu of estimation. In particular, if both the base station 12 and the terminal 13 can determine their absolute locations, a direction of motion with respect to the serving cell 32 may be determined based on the absolute location of the serving cell 32 (i.e., its associated base station 12) and two or more absolute location measurements made by the terminal 13.

In some techniques, a frame of reference may be determined relative to the serving cell 32. In FIG. 6, this is shown in degrees (other units may be used), where the right hand horizontal direction is arbitrarily set to 0°; however, to emphasize, this is arbitrary, and any direction may be set as 0°. In such cases, directions may be determined relative to this frame of reference. It is also noted that, in other variations, a frame of reference may be determined relative to other points in the network, and the techniques disclosed herein are not limited to any particular frame of reference.

Furthermore, in some variations of these techniques, the terminal 13 may be able to estimate its location relative to the serving cell 32 by measuring signal strengths of the serving cell and/or one or more neighboring cells. It is noted that the signal strength of a serving cell may refer to the signal strength of one or more base stations within the serving cell. An example of such a variation may be discussed in conjunction with FIG. 6. In FIG. 6, terminal 13 may take signal strength measurements of various cells 11, as it moves to a position 62. From position 62, the signal strength measurements of cells 61, as indicated by lines 63, may be relatively strong, while the signal strength measurements of cells such as those in region 65, e.g., as indicated by line 64, may be relatively weak. Based on such signal strength measurements, the terminal 13, at position 62, may determine that it is estimated to be in a location between 0° and 90° relative to serving cell 32 and that it may exclude from the reduced NCL those cells in a region between 135° and 315°, relative to serving cell 32, as shown by line 66.

In a further variation of the disclosed techniques, a radial direction relative to the serving cell 32 may be provided, instead of in exact terms, which may be done in terms of predetermined sectors. The number of sectors used may be set to an arbitrary number; four sectors will be used in the following examples, for purposes of simplicity.

Figure 7:
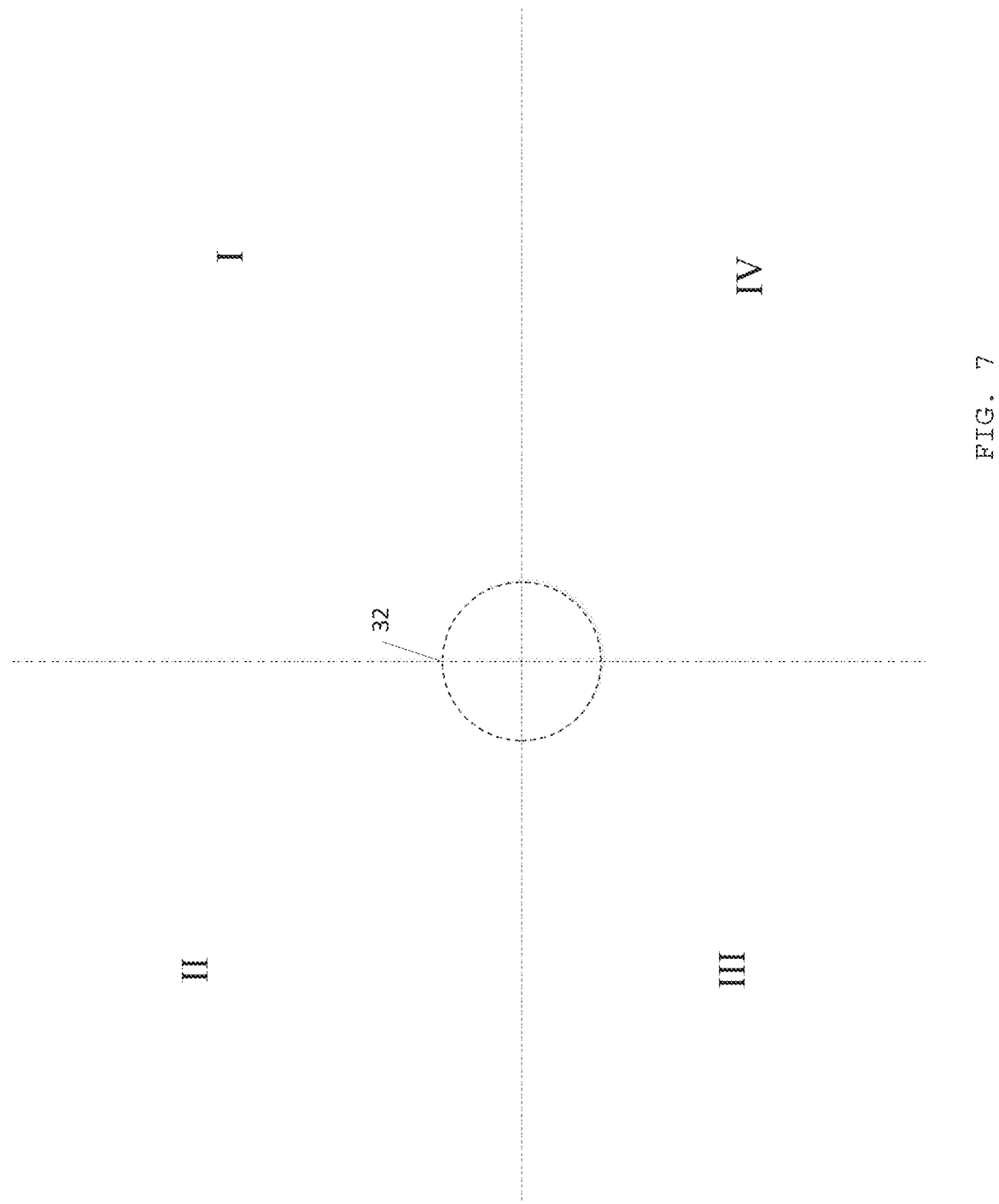
FIGS. 7 and 8 show sector-based variations that may be used in conjunction with various disclosed techniques.

FIG. 7 shows an example in which the sectors may be predetermined arbitrarily. In the example of FIG. 7, four sectors, labeled I, II, III, and IV, are defined by horizontal and vertical axes drawn through the center of serving cell 32. However, the axes may be arbitrarily rotated. Furthermore, the sectors need not be of equal size; i.e., the angles between the lines may vary. Additionally, the sectors may be defined, instead of by lines going through the center of serving cell 32, by rays extending from the center of serving cell 32. In this latter fashion, any number of arbitrarily-sized sectors may be defined, relative to serving cell 32.

Figure 8:
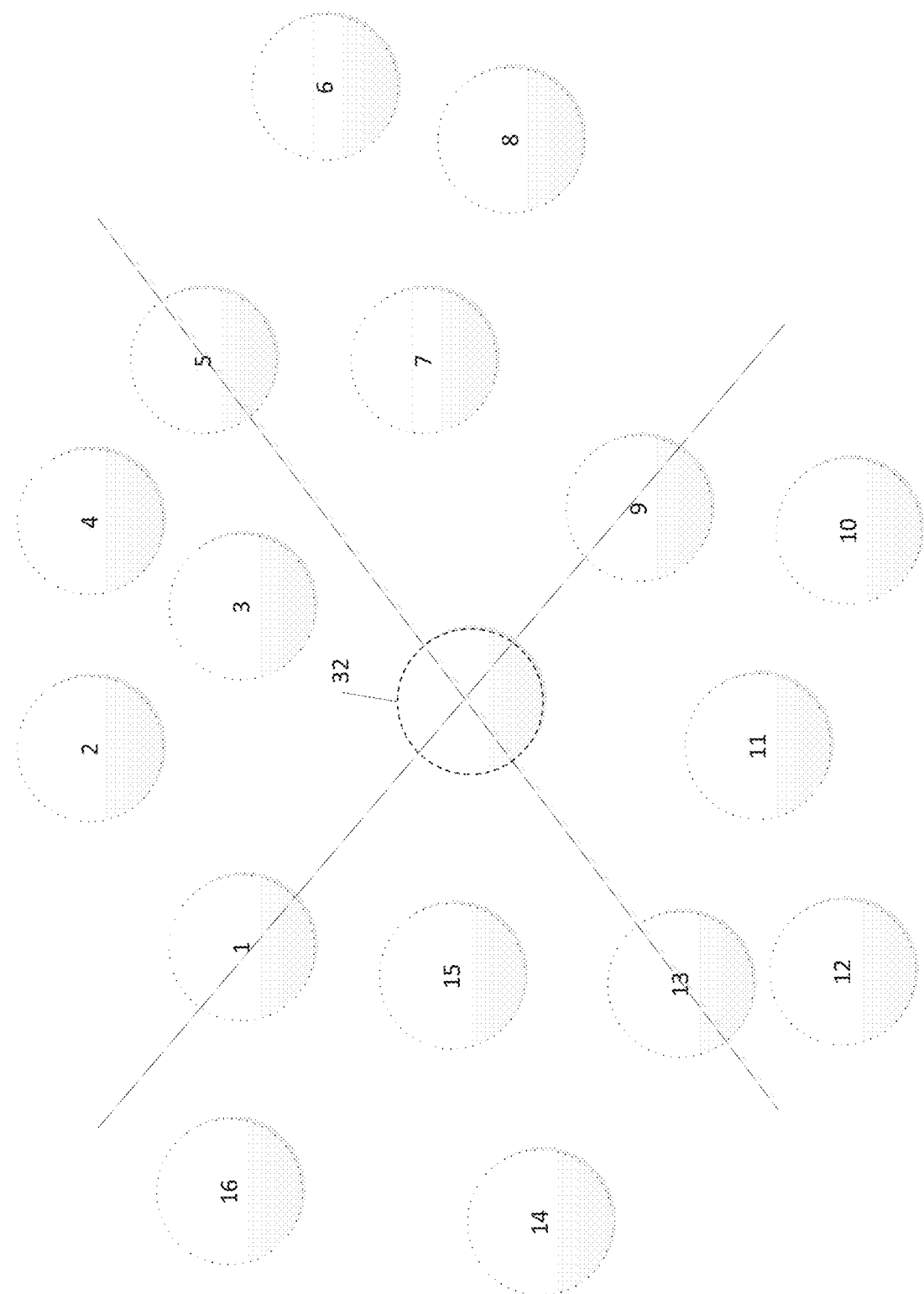

While the arbitrary sector definitions of the examples discussed above may be simple, an alternative sectorization technique may be used. In some scenarios, exact radial information may be provided only for cells lying closest to boundaries between sectors, which may be of equal sizes, as shown in the example of FIG. 8. In FIG. 8, the cells labeled 1, 5, 9, and 13 may be defined to be sector boundary cells, relative to serving cell 32. Cells not defined as sector boundary cells (e.g., cells 2-4, 6-8, 10-12, and 14-16) may be identified as being within one of the defined sectors. In some variations, such as the example of FIG. 8, the sectors may be defined such that there are the same, or nearly the same, number of cells in each sector; but the disclosure is not thus limited. Furthermore, as noted with respect to FIG. 7, the sectors need not be of equal size; the sectors may be defined by rays extending from the center of serving cell 32, or both. In this latter fashion, any number of arbitrarily-sized sectors may be defined, relative to serving cell 32.

In the variations of FIGS. 7 and 8, the number of sectors may be made known to the terminals 13, e.g., by means of broadcast signaling, provisioning, standardization, or other techniques. In some network technologies, this may be signaled by ordering the cells in the NCL in radial order (e.g., clockwise or counterclockwise), starting with a sector boundary cell, where a given terminal 13 either knows or is provided with a number of sectors in a set of sectors where a same number of cells may be located in each sector. In an alternative approach, the NCL or another communication may include indications that some cells in the NCL are sector boundary cells, and may also indicate in which sectors various other cells in the NCL are located.

Using the sectorization techniques discussed above, a particular terminal 13, currently associated with a serving cell 32, may be able to reduce the NCL based on various signal strength measurements. For example, the terminal 13 may measure signal strength for the serving cell 32 and for the sector boundary cells, a number of cells located in different sectors, or both. The measurement of the serving cell 32 may then be compared with the other measured cell signal strengths. In one technique, based on these comparisons (which may take into account differences in cell transmit powers, if known, and which may take the form of differences), various sectors may be eliminated from the NCL to obtain the reduced NCL. For example, if a particular sector boundary cell has a signal strength greater than that of the serving cell 32, as reflecting that the terminal 13 is moving into a half-plane in which the particular sector boundary cell is located and may thus eliminate the cells located in the opposite half-plane. This may be combined with measurements from other cells to further determine in which sector of the half-plane in which the sector boundary cell is located. For example, once the half-plane is determined, measurements taken from other cells located in the sectors surrounding the particular sector boundary cell may be considered, and it may be determined that the terminal 13 is moving into the sector in which the stronger of the measurements occurs; this may be used to eliminate the cells located in the other sector(s). In a further variation, the terminal 13 may determine if the signal strengths of two of the sector boundary cells are both stronger than that of the serving cell, and if so, the terminal 13 may determine that it is currently in or headed in a direction defined by a sector bordered by the two sector boundary cells. In such a case, the cells not located in this sector may be eliminated from the NCL to obtain a reduced NCL containing cells of only one sector.

Sectorization may also be used in conjunction with location determination by the terminal 13. If the serving cell 32 broadcasts its location (e.g., in latitude and longitude, or any other such measure), the terminal 13 may determine this location based on such broadcasts and may determine its own location (e.g., using GNSS or another location determination technique, as discussed above). Based on this information, the terminal 13 may determine its direction and location relative to the serving cell 32 and may use this information to determine a sector in which it is currently located or toward which it is moving. The terminal 13 may then eliminate from the cells in the NCL those cells not located in the relevant sector (or may optionally include one or more cells from neighboring sectors).

Figure 9:
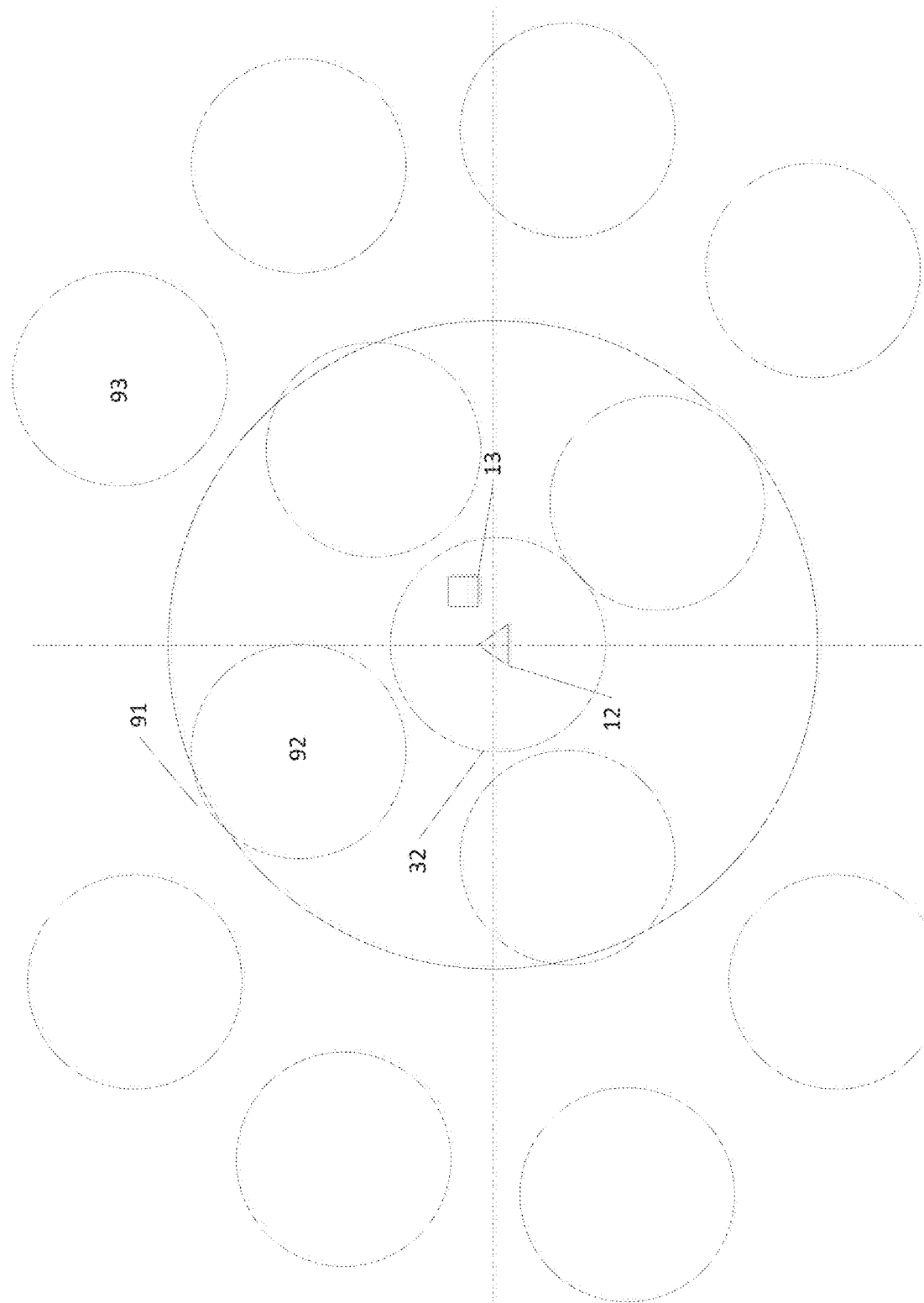
FIG. 9 shows an illustrative concept of zone-based distance information that may be used along with various disclosed techniques.

The above techniques may focus mainly on use of direction of a terminal 13 relative to a serving cell 32. However, distance from a serving cell 32 may also be useful in forming a reduced NCL. For example, the terminal 13 may be informed of distances between the serving cell 32 and other cells 11. Such distance information may, e.g., indicate relative distance, rather than absolute distance; for example, the distance information may indicate that another cell 11 is within some distance range from the serving cell 32. FIG. 9 shows an illustrative example of this concept. In FIG. 9, a terminal 13 may be in a serving cell 32 that may be served by a base station 12. In one example, the terminal 13 may be informed about which cells (e.g., cell 92) are within some distance range 91 of serving cell 32 and which cells are outside some distance range 91 of serving cell 32, or both. This information may be used in several ways, in variations of the disclosed techniques.

In one variation, the NCL may be reduced simply based on whether cells are within some distance range 91 or outside of some distance range 91. For example, if the terminal 13 is stationary or slow-moving within serving cell 32, it may only need to measure cells that are close by (e.g., within distance range 91). On the other hand, in a further non-limiting example, if the terminal 13 is quickly moving away from serving cell 32, it may only need to measure only cells outside the distance range 91 (or, in some cases, cells either within or outside of distance range 91.

The above concept may be combined with previously-discussed direction of motion determination of the terminal 13 to further eliminate cells in forming a reduced NCL. For example, a direction of motion of terminal 13, relative to serving cell 32, may be determined, and, in a non-limiting example, the terminal may eliminate from the NCL the cells located opposite the direction of motion and outside (or within) a distance range 91 may be eliminated to obtain the reduced NCL. Note that other possibilities, combining a distance criterion with the various techniques discussed above, are possible, and the examples provided here are not intended to be limiting.

Figure 10:
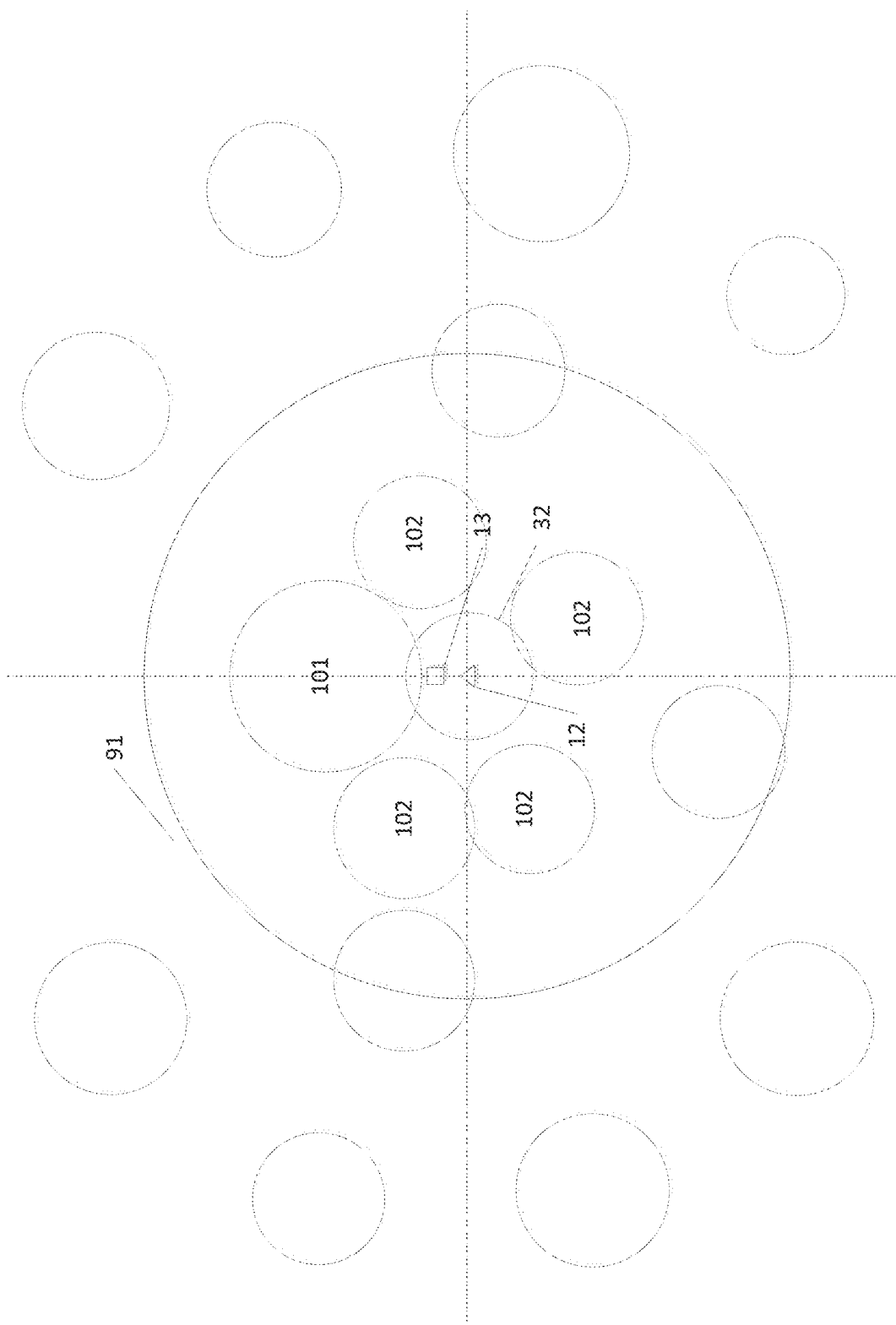
FIG. 10 illustrates a modification that may be made to various techniques.

In a further variation of the above techniques, as illustrated in FIG. 10, if one of the sector boundary cells (e.g., cell 101) is very close to the serving cell 32, then it may be possible that the terminal 13 may determine that the sector boundary cell 101 is stronger than the serving cell 32 (and thus that the terminal 13 may be closer to the sector boundary cell 101 than to the serving cell 32), even though the terminal 13 may still be close to the serving cell 32. In such a case, some cells near the serving cell 32 may still be valid candidate cells and may thus still need to be measured. To avoid the possibility that the terminal 13 does not measure some nearby cells, a set of cells within some given proximity to the serving cell, e.g., the cells labeled 102 in FIG. 10, may be identified as not being appropriate for elimination from the NCL (e.g., such cells 102 may be designated for continued monitoring as long as the measured strength of the serving cell 32 is above some predetermined threshold value).

Figure 11:
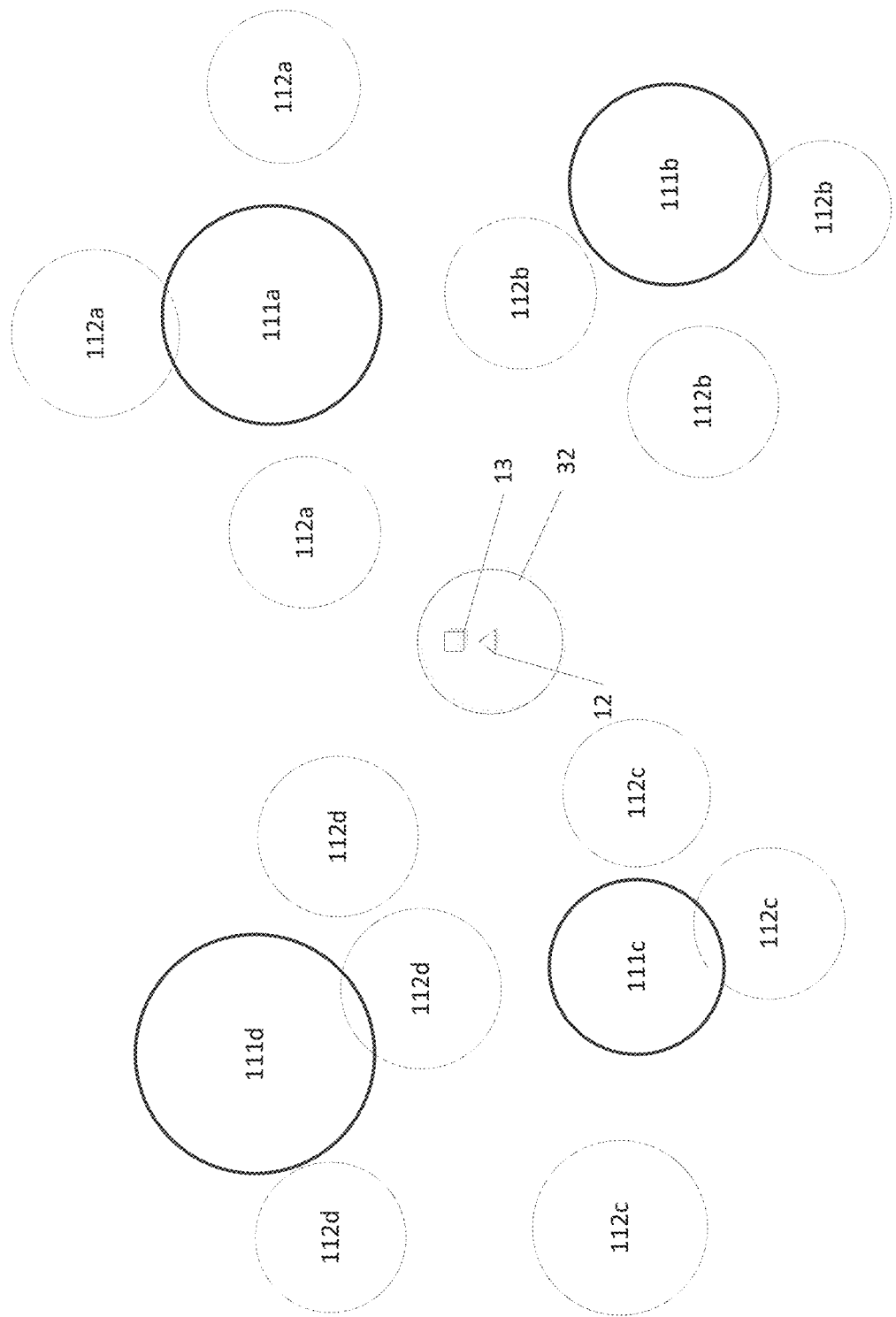
FIG. 11 shows an example of a further technique according to aspects of this disclosure.

FIG. 11 provides a pictorial illustration of an example of a further technique based on geographical considerations. In this technique, cells may be grouped into geographic "neighborhoods," which respective neighborhoods having respective "head cells." For example, cells 111a and 112a may be one neighborhood, cells 111b and 112b may be a second neighborhood, etc. The largest (strongest) cell in a neighborhood may be chosen as the head cell, but this is a non-limiting example. In one variation, the terminal 13 may measure the head cells 111a, 111b, 111c, and 111d and, optionally, other cells 112x in neighborhoods in which the respective head cell 111x is determined to be one of the stronger head cells (in this discussion, "x" is being used as a generic reference symbol). By way of non-limiting example, terminal 13 may take measurements of the head cells 111a, 111b, 111c, and 111d and may determine that head cells 111a and 111d are the two strongest head cells and may then also measure cells 112a and 112d and not cells 112b and 112c.

As noted above, in one non-limiting example, the strongest cell in a neighborhood may be chosen to be the head cell. This may provide one way to prevent a terminal from discounting as possible cell reselection candidates cells in a neighborhood of a head cell having low signal strength measurements. An alternative way to address this (or a further technique that may also be used) may be to provide an offset or other indication of relative head cell transmit powers to the terminal, which may be provided, e.g., in the NCL.

Another way of choosing head cells may be to choose cells providing coverage closest to the serving cell. This technique may prevent a terminal from discounting a neighbor cell that is closer than another neighbor cell simply because the head cell of its neighborhood is located farther away from the serving cell than the head cell of the neighborhood of the other neighbor cell.

In other neighborhood-based techniques, a terminal may measure only those cells located in the same neighborhood as the present serving cell 32, or serving cell 32 may not be considered to be part of a neighborhood (but may be monitored, in any case). If the serving cell 32 is considered to be part of a neighborhood, in another example, the terminal 13 may monitor the serving cell 32 and the head cell of the neighborhood in which the serving cell 32 lies.

In a further variation, a terminal may monitor cells 112x other than head cells 111x but may do so less frequently than for head cells 111x.

Grouping of cells into neighborhoods may be done relative to a serving cell, or the grouping into neighborhoods may be done independently of the serving cell. In the above variation involving choosing cells providing coverage closest to the serving cell as the head cells, this is a case in which the grouping into neighborhoods may naturally follow from the choices of head cells. Alternatively, choices of head cells may follow from the grouping into neighborhoods.

In further variations, the NCL may comprise lists of neighborhoods to be monitored, and the process of reducing the NCL may include eliminating neighborhoods, individual cells, or both. There may be no limit to the number of neighborhoods listed in the NCL.

The number of cells in a neighborhood may be fixed or variable, and the number of cells in a neighborhood may be selected based on various considerations. One example of a consideration in creating neighborhoods is that there may be a tradeoff between the accuracy of measurement, insofar as the measurement of the head cell accurately reflects the other cells in the neighborhood, and the amount of reduction in the number of neighborhoods (and thus the number of measurements that may need to be taken). That is, with fewer cells per neighborhood (which may result in more neighborhoods), more measurements may be required, but the measurements may be more closely representative of all the cells in the neighborhood; while with more cells per neighborhood (which may result in fewer neighborhoods), there may be fewer measurements required, but the measurements may not represent all cells in the neighborhood as accurately.

If the terminal is to measure all cells in some neighborhoods, the number of neighborhoods in which all cells are to be measured may be, for example, specified in standards or determined as a fraction of the number of neighborhoods (e.g., but not limited to, two-thirds) or determined as an absolute number (which may, e.g., be zero). In a further variation, neighborhoods in which all cells are to be measured may be determined based on head cell strength; for example, if the strongest head cell is determined to have a particular signal strength, other neighborhoods whose head cell strength measurements are within some predetermined tolerance (e.g., some number of decibels or some fraction) of the strongest head cell signal strength may be included in the reduced NCL.

Neighborhood-based techniques may also be combined with the concept discussed with respect to FIG. 10, namely, that cells close to the serving cell may continue to be included in the reduced NCL.

A further way to derive a reduced NCL may be to use a two-phase cell reselection process. This may build on the previously-discussed technique in which cells close to the serving cells and head cells of nearby neighborhoods are included in the reduced NCL. It is noted that, in some variations, which may be backward-compatible with previous standards, all cells may be included in the NCL, but the "nearby cells" and "head cells" may be identified, e.g., by means of additional information provided; alternatively, an indication of which cells should always be measured may be provided. In this technique, the terminal may measure the head cells of nearby neighborhoods and may, optionally, also measure the cells close to the serving cells ("nearby cells"). In the case of reselection to one of the "nearby cells," the procedures may be similar to conventional cell reselection techniques that are one-phase techniques. However, a two-phase reselection process may be used if the terminal performs reselection to one of the measured head cells.

In a two-phase reselection process according to a disclosed technique, if the terminal reselects to a head cell in the initial phase of reselection, the terminal may delay performing one or more mobility updating procedures, for example, routing area update/location area update, until after the terminal measures/evaluates cells located near that head cell (e.g., the cells in the same neighborhood as the head cell, but not necessarily limited to these cells). If the terminal determines that one of the cells located near that head cell is a better cell to which to reselect than the head cell, the terminal may then reselect to the better cell, in a second-phase of the reselection process. Normal procedures (e.g., mobility-related updates) may then follow.

In conjunction with the two-phase reselection technique, the terminal may implement a timer to limit "out-of-service" time between the two phases of reselection discussed above. That is, after the first phase, the timer may be set to delineate a predetermined time, and if a better cell is not found, in the second phase, prior to the expiration of the timer, the terminal may then perform relevant procedures (e.g., mobility-related updates) using the head cell.

To further limit out-of-service times due to two-phase reselection, in some types of networks, when possible, a head cell within the same registration area as the serving cell may be selected. In a further alternative, the terminal may not "camp on" the head cell, as an intermediate measure, during the second phase of the reselection process, which may serve to decrease the duration of the process.

Figure 12:
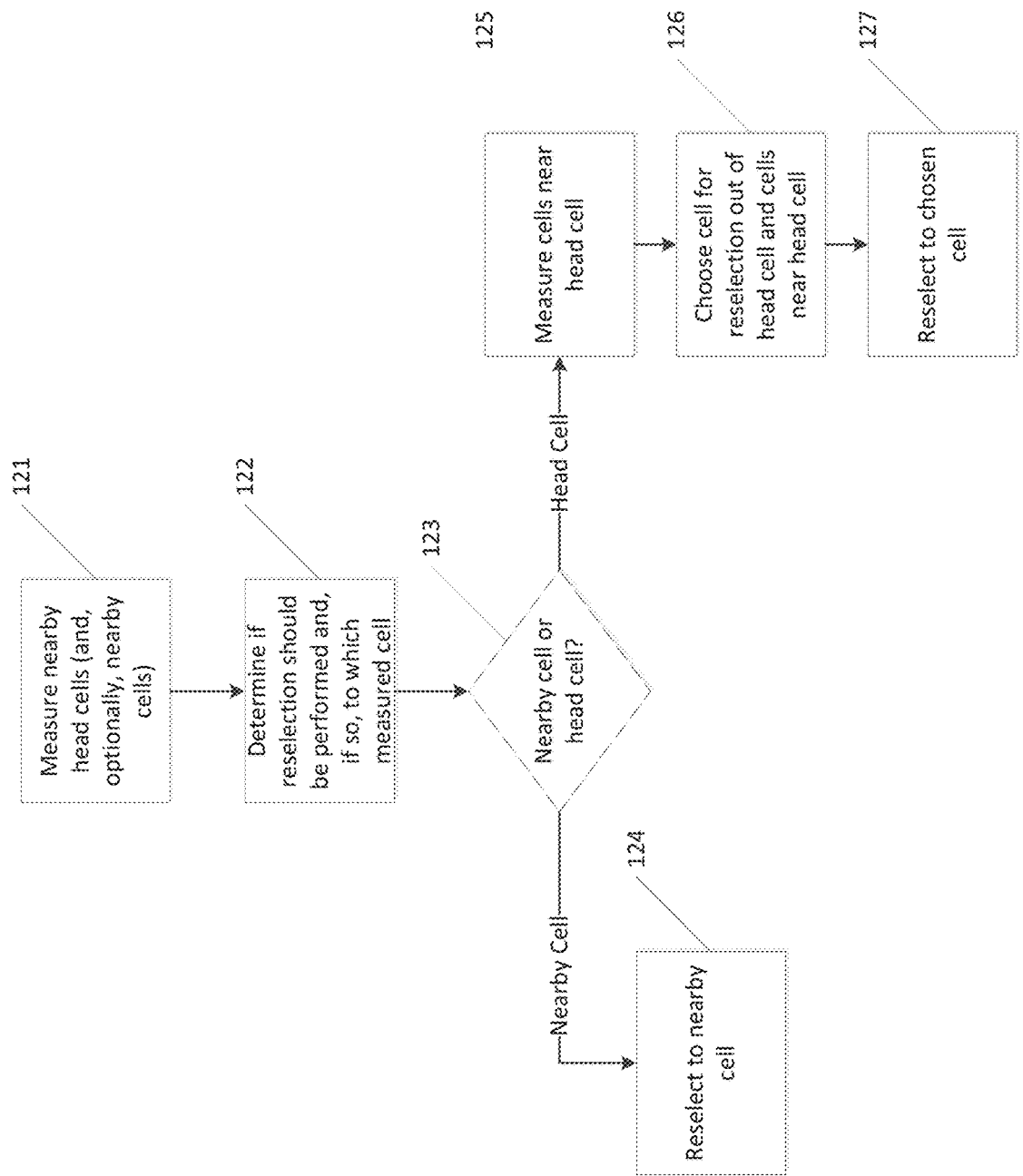
FIG. 12 shows an example of a flow diagram of a technique using two-phase reselection according to an aspect of this disclosure.

The above two-phase reselection procedure may be illustrated by the flow diagram of FIG. 12. The terminal may measure nearby head cells and, optionally, nearby cells 121. The terminal may then determine if reselection should be performed and, if so, to which measured cell 122. If the terminal determines that reselection should be performed, the process may then continue based on whether the cell chosen for reselection is a nearby cell or a head cell 123. If the chosen cell is a nearby cell, the terminal may then simply reselect to that cell 124. If the chosen cell is a head cell, the terminal may then measure cells near the head cell 125. The terminal may then, based at least in part on the measurements, choose a cell for reselection 126. The cell for reselection, in this case, may be the head cell or one of the cells near the head cell. Reselection may then proceed to the chosen cell for reselection 127.

Because terminals may initially select to head cells, in some variations of the two-phase reselection techniques, the head cells may be changed, depending on the current serving cell, e.g., to effect load-balancing. For example, for a given neighborhood, a different cell may be the designated head cell, depending upon the location of the present serving cell of the terminal.

In the case of a swiftly-moving terminal, if a head cell is selected, the second phase of the process may be skipped, and the terminal may simply reselect to the head cell and not evaluate the cells near the head cell. In such a scenario, the terminal may eliminate from the NCL all cells that are not head cells because reselection to a "nearby" cell may result in a need for further reselection soon after. The speed of the terminal may thus be used as a criterion to determine if the second phase of the two-phase reselection may be conducted. For example, if the speed of the terminal exceeds some predetermined speed threshold, the terminal may skip the second phase; otherwise, the second phase may be carried out.

The above reselection procedures may be modified in some cases, to address various particular scenarios. For example, in a case of a train carrying hundreds of people, hundreds of terminals may be performing cell reselection and may reselect to the same cell simultaneously. One way to address this, to accomplish some load-balancing, may be to have legacy terminals perform reselection to nearby cells, while new terminals, provided with the capabilities discussed above, may be able to reselect only to head cells. In conjunction with this, multiple head cells may be designated for a single group/neighborhood, and further load-balancing may be accomplished by having terminals reselect among the head cells for a given group/neighborhood by choosing a head cell at random or by means of some pseudo-random technique (e.g., based on a device identifier, for example, such as the International Mobile Station Equipment Identity (IMEI) of the device).

In various variations of the above techniques, and in various networks, cells may transmit indications of their transmit powers, e.g., in control channels, or a terminal may otherwise obtain information about the transmit powers of various cells to be measured. This knowledge of transmit power may be used to modify, e.g., reselection techniques as presented above. For example, knowledge that the transmit power of a given cell is low may indicate that, at a given distance (e.g., if the locations (at least some relevant subset) of cells and the mobile are known), the given cell may be less likely to be a good reselection candidate than a cell with higher transmit power. Cell transmit power may also be compensated for, e.g., in a case in which power measurements indicate that a particular cell is stronger than that of the serving cell and may otherwise cause other nearby cells to be eliminated from consideration for reselection, even though such cells may actually be closer to the terminal. Transmit power compensation may be performed, e.g., by adjusting measured signal strength values or by choosing not to eliminate from consideration/from future measurements (i.e., from the NCL in forming a reduced NCL) cells that might otherwise be eliminated, or both.

In a further variation of various techniques discussed above, different classes of cells may be determined while forming the reduced NCL. For example, the cells in the NCL may be categorized by the terminal into three classes: (1) in reduced NCL/high-priority; (2) in reduced NCL/low-priority; and (3) not in reduced NCL. It is noted that this is only a non-limiting example, and there may be, for example, more classes. Such categorization may be based, e.g., on relative location with respect to the serving cell, the terminal, or both. Such categorization may be used to determine, for example, different frequencies with which various cells may be measured. In one variation, those cells classified as "not in reduced NCL" may not be measured or reported on (or both) at all. In another variation, there may be no category of "not in reduced in NCL," but rather, all cells of the NCL may be designated for measurement, reporting, or both, but with varying frequencies of measurement, depending on their classifications; in this scenario, all cells of the NCL may be treated at some point.

As discussed above, relative geographical indications may be used in some techniques to determine whether to maintain cells in the reduced NCL (or to measure/report cells more or less frequently). Geographical indications may be relative or absolute, again, as discussed above. A further technique for determining relative locations of cells may be based on observations of NCLs broadcast by multiple cells. This may be based, for example, on the following ideas: (a) cells listed in a large number of NCLs broadcast by cells in the NCL provided by the serving cell may be more likely to be close to the serving cell; and (b) cells appearing in few NCLs broadcast by cells in the NCL provided by the serving cell may be farther from the serving cell, may have smaller coverage, or both. For cells that fall under (b), the terminal may elect to reduce measurements, reports, or both, as such cells may be less likely candidates for use by the terminal for, e.g., reselection. For example, suppose that Cell A is the serving cell and that Cell A's NCL includes Cells B, C, D, E, F, and G. Suppose, further, that Cell F is included in all of the NCLs broadcast by Cells B, C, D, and E and that Cell G is listed only in the NCL broadcast by Cell B. If Cell B is relatively weak, then Cell G (which may likely be close to Cell B and may likely be relatively farther from Cells C, D, E, and F) may be eliminated from the reduced NCL or may be designated as requiring less frequent measurement/reporting.

Collocation of base stations may also be considered in conjunction with some or all of the above techniques. As new radio access networks are deployed, their base stations may coincide with base stations of other radio access networks. As such, the coverage areas of the cells using different frequencies or radio access technologies, but which use a common base station or base station site, may be similar (in one example, one may be a subset of another). Although measurements based on different radio access technologies may not be useful, the fact of collocation may be useful. For example, a high-powered Universal Mobile Telecommunication Service (UMTS) 900 MHz cell operating from a particular site may likely have a larger coverage area than a 2.1 GHz cell operating from the same site; hence, if the measured signal strength of the UMTS 900 MHz cell is low, then the 2.1 GHz UMTS cell is unlikely to be a candidate for reselection in the near future, and measurement/reporting of that cell may (also) be reduced. Similarly, a terminal that detects that the signal strength of a particular cell ("Cell A") collocated with another cell ("Cell B") is getting weaker may be unlikely to reselect to Cell B, especially if it is also known that the coverage area of Cell B is smaller than that of Cell A. Therefore, if a terminal is informed about collocated cells, it may be possible for the terminal to use this information to reduce the number of cells to be measured/reported.

In a further alternative that may be used in combination with various above techniques, rather than obtaining cell location from the network, or exclusively from the network, a terminal may compile locations of various cells and may maintain its own database of cell locations.

Such information may, for example, be transmitted to a terminal by its present serving cell, e.g., in the form of an NCL indicating which set or sets of neighbor cells are collocated. Alternatively or additionally, a given cell may transmit information indicating which of its neighbor cells are collocated with the given cell. Additionally or alternatively, the terminal may be able to estimate relative cell coverage based on different cells' carrier frequencies.

In some radio access technologies, many cells within a particular region of an operator's network may operate using the same carrier frequency or frequencies. This situation may, in some cases, arise in places in which there are multiple radio access technologies covering the same area or overlapping areas. In such cases, monitoring of neighboring cells may be based on monitoring of different carrier frequencies, and the burden of measurement may be proportional to the number of different carrier frequencies that need to be monitored. In fact, in some radio access technologies (e.g., extended-Universal Telecommunications Radio Access Network (E-UTRAN)), a "neighbor cell list" may include lists of carrier frequencies without providing cell details. In such cases, where there may be widespread coverage of a particular technology at a particular carrier frequency, knowledge of the geographic locations of individual cells may be of less value, given that the carrier frequency may need to be monitored for candidate cells, regardless of location. However, there may be regions in which this is not the case, i.e., where coverage of a particular radio access technology (RAT)/frequency combination may be limited. In such a case, knowledge of the geographic extent of the coverage may be useful in determining if and when neighboring cell measurements on that frequency may be omitted.

For example, in FIG. 13A, the base station 12 of serving cell 32 may be operating and supporting terminals (e.g., terminal 13) on a carrier frequency F1, and there may be neighboring cells 131 that operate using a carrier frequency F2. In such a case, knowledge by the terminal 13 of coverage regions of cells using F2 may be useful in determining if measurements on carrier frequency F2 may be useful. One particular example of this may be in a case in which measurements on frequency F2 by a terminal 13 may only be useful if the terminal 13 is located in a particular region of serving cell 32 in which neighboring cells 131 operating at frequency F2 overlap with serving cell 32 (this is one example, but the disclosed techniques are not necessarily limited to this example). Techniques described above may be useful in providing a terminal 13 with information as to when or if the terminal 13 may need to monitor neighboring cells operating at frequency F2, for example.

In one non-limiting example, as shown in FIG. 13B, "radial-type" indications may be of particular value. In the figure, two radials 132 are shown, extending from the center of serving cell 32, and defining a region in the direction indicated by arrows 133. A minimum or maximum distance indication may be used, alone, in combination with each other, or in combination with radial indications. FIGS. 13C and 13D depict examples of such indications, shown by arrows 134 and 136 and arcs 135 and 137, respectively. Indications of "coverage" may be in positive or negative terms, i.e., they may indicate regions in which there is coverage or regions in which there is no coverage. If the terminal 13 is located in or is about to enter a region in which there is coverage, the terminal 13 may then make measurements on the relevant frequency (or frequencies, in cases in which multiple carrier frequencies may being used by multiple cells or using multiple RATs, for example). Similarly, if the terminal 13 is not located in such a region or is leaving such a region, the terminal 13 may not need to make such measurements. Knowledge of such a region may thus be combined with further geographical information (e.g., position, direction of the terminal, or both) to aid the terminal 13 in determining whether to make measurements.

In a further variation, one or more "representative cells" may be determined (for example, signaled, e.g., by base station 12) to indicate an edge of a coverage area. If the terminal 13 determines that signal strength of such representative cells is weak or if it is decreasing with time, the terminal 13 may be able to cease monitoring the frequency of the representative cell/coverage area, or it may decrease frequency of monitoring. Physical layer identifiers may be used to identify individual cells for this purpose.

The above techniques addressing measurements on different carrier frequencies may be used, for example, in cases in which there are multiple RATs available to the terminal 13. For example, present serving cell 32 may use one RAT in which different cells may use different carrier frequencies, but it may also overlap with cells using a different RAT using a common carrier frequency, or vice versa. Base station 12 of serving cell 32 may provide terminal 13 with an NCL that indicates the different cells operating at different carrier frequencies, as well as a frequency or frequencies corresponding to the neighboring or overlapping cells that may operate on a common frequency (or frequencies). Reducing the NCL based on geographical information may thus involve one or more of the above techniques to determine if one or more cells, frequencies, or both may be eliminated from those on which measurements should be made.

Figure 14:
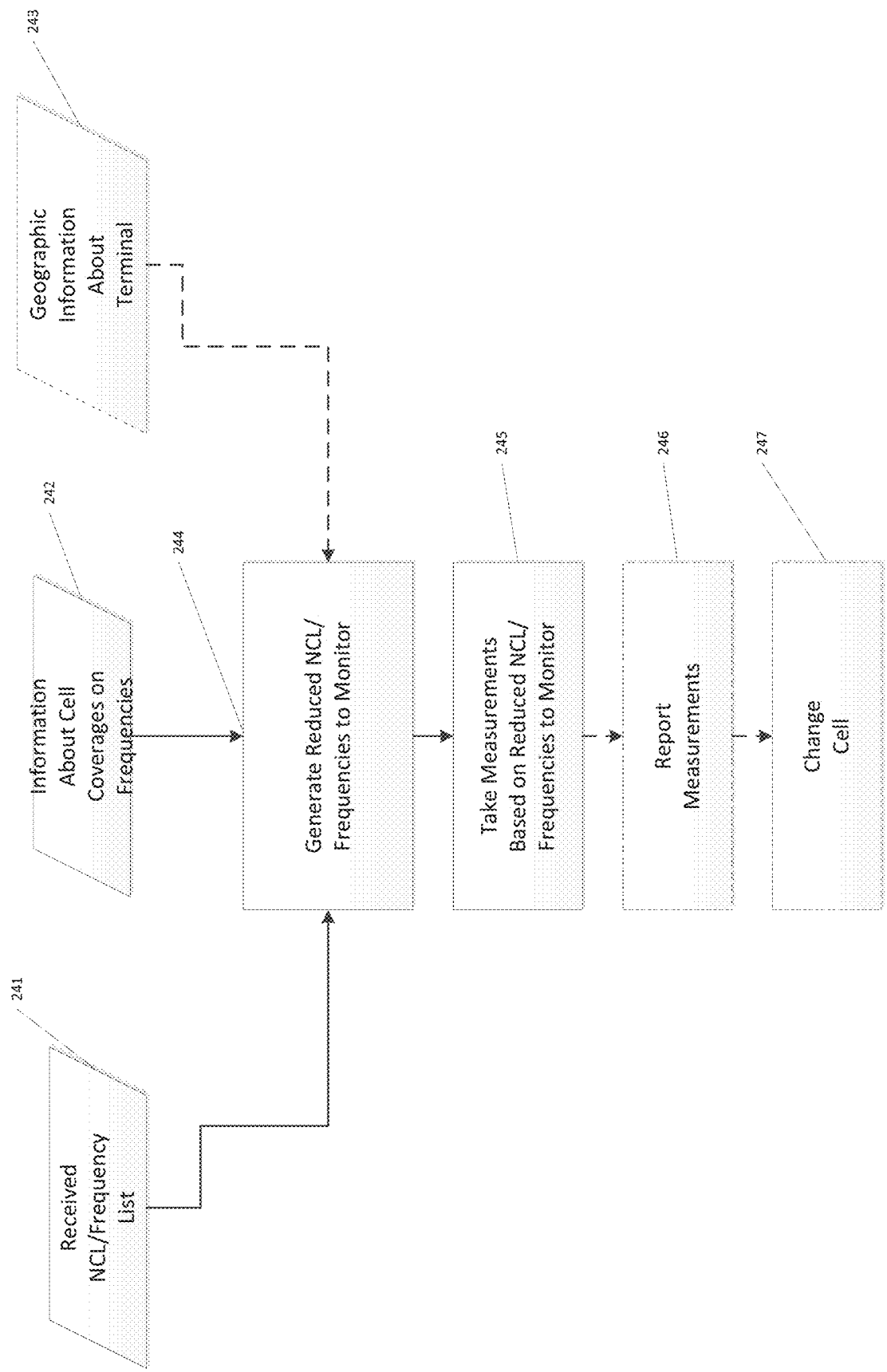
FIG. 14 shows a conceptual flow diagram of a process according to various aspects of this disclosure.

FIG. 14 shows an overall flow diagram of an illustrative example process that may be performed at a terminal 13 in a communication network in which there may be overlapping cells using a common carrier frequency. The terminal 13 may receive a neighbor cell list 241, which may include a list of cells, frequencies, or both. The terminal 13 may also receive or otherwise ascertain geographic information associated with one or more of the neighboring cells in the NCL 242; this information may be received, e.g., from the network, with the NCL 241 or separately from the NCL 241. This geographic information may relate to regions of overlap (e.g., in the case of cells operating on a common frequency) to locations of cells, or to both. Additionally, geographic information may also be ascertained 243 regarding the terminal 13. The aforementioned information (NCL 241, geographic information relating to the NCL 242, and, optionally, geographic information about the terminal 243) may be used to generate a reduced NCL 244 (which, again, may involve reducing the cells, frequencies, or both to be measured). The reduced NCL may then be used to take measurements 245. The resulting measurements may optionally be reported to the network 246. Also, optionally, the measurement information may be used in changing the serving cell of the terminal 13 to a new serving cell (e.g., cell reselection, handover, etc.) 247.

The network may be able control use of the above techniques and may be able to use results reported based on such techniques for various purposes. For example, the network may be able to signal to a given terminal or group of terminals when or when not to use reduced NCL-based measurement and reporting. This may be done using point-to-point signaling or broadcast transmissions (e.g., system information) or both. Permission may be, e.g., device-specific, mobility-specific (e.g., permitted only for devices classified as "low mobility"), state-specific (e.g., permitted in idle mode but not in connected mode), or any combination of these. In one specific example, to which these concepts are not limited, the network may prohibit the use of the above techniques for terminals in connected mode in response to the load level in a cell exceeding a threshold, which may permit congestion-based mobility procedures.

The network may use information reported by terminals using the above techniques for various purposes. For example, the knowledge of relative geography of cells and reported measurements may be used to initiate "blind" handovers to a cell that is not monitored by the terminal being handed over. This may be based, e.g., on an estimate of the terminal's trajectory. Therefore, it is not necessary for the terminal to always be monitoring the cell that is the "best" handover candidate; the network may determine the "best" handover candidate.

Figure 15:
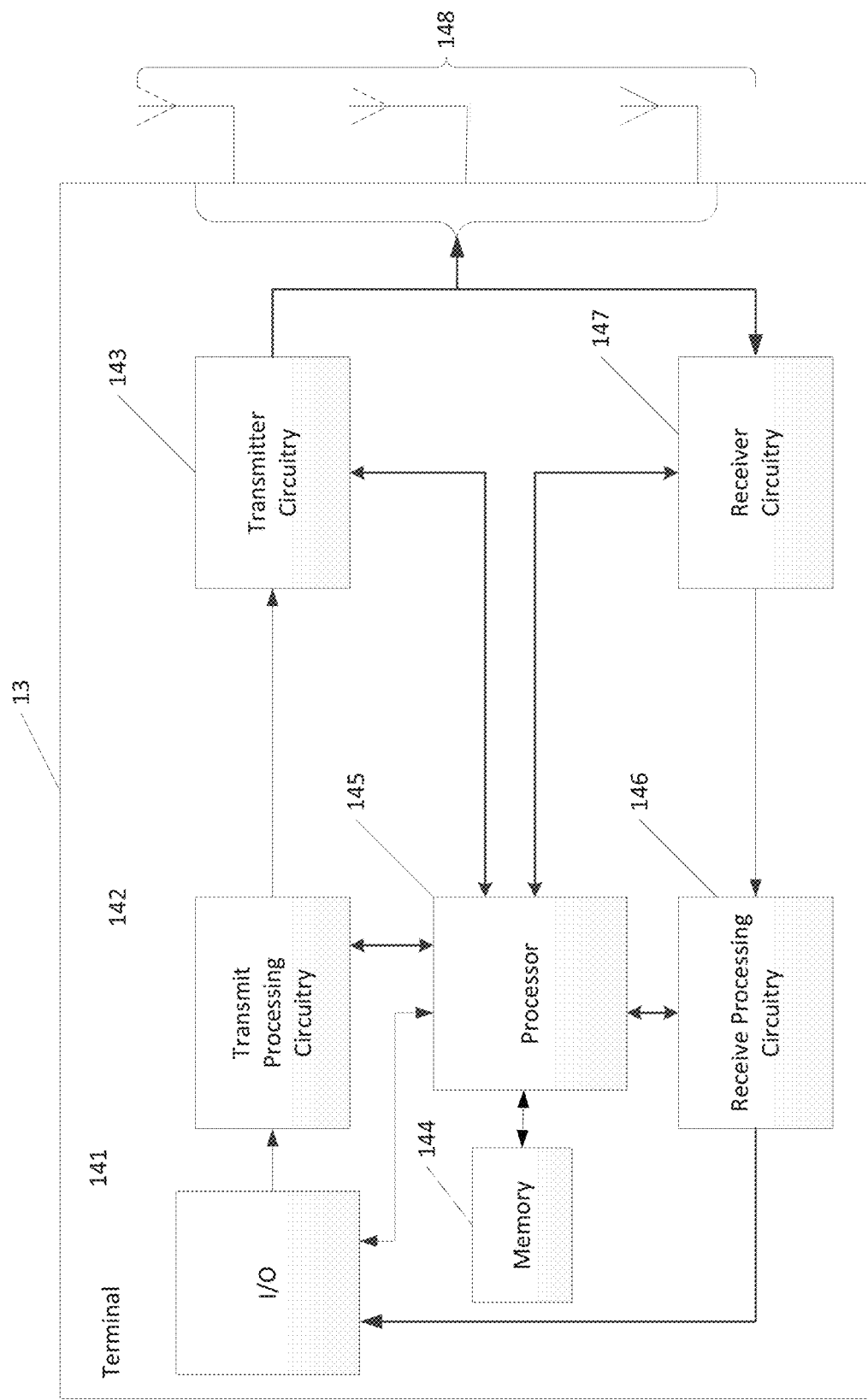
FIGS. 15 and 16 show, respectively, example block diagrams of terminals and base stations according to various aspects of this disclosure.

The above techniques may be implemented in numerous ways. FIG. 15 shows a conceptual block diagram of a possible implementation of a terminal 13, to which the above concepts are not limited. As shown in FIG. 15, terminal 13 may include transmit processing circuitry 142 coupled to provide signals to be transmitted to transmitter circuitry 143. The transmit processing circuitry 142 may, for example, perform such operations as encoding and modulation, but is not thus limited. Data/information may be obtained, e.g., via input/output (I/O) devices 141, which may include, for example, one or more of a keypad, a keyboard, a mouse, a microphone (and may further be equipped with voice processing/encoding capabilities, such as sampling and encoding/decoding), a display, a speaker, a printer, or other such devices. I/O devices 141 may also be coupled to receive processing circuitry 146 and may obtain from receive processing circuitry 146 information that may be output. Receive processing circuitry 146 may, for example, perform such operations as decoding and demodulation but is not thus limited. Receive processing circuitry 146 may, in turn, be coupled to receiver circuitry 147. Transmitter circuitry 143 and receiver circuitry 147 may be coupled to one or more antennas 148. The transmitter circuitry 143 and receiver circuitry 147 may share antennas 148 or may be coupled to separate antennas or sets of antennas 148. Transmitter circuitry 143 may perform, for example, upconversion, amplification, etc., on signals to be transmitted over antennas 148. Receiver circuitry 147 may perform, for example, downconversion, filtering, amplification, etc., on signals received from antennas 148. Transmitter circuitry 143 may include multiple branches for multiple antennas or other parallel processing techniques. Similarly, receiver circuitry 147 may include multiple branches for multiple antennas or other processing techniques. The transmitter circuitry 143 and the receiver circuitry 147 may share circuitry or may be combined into a transceiver. Transmitter 13 may further include one or more processors 145, which may be microprocessors, central processing units, graphics processing units, processing cores, digital signal processors, or other types of computing devices, and may also include memory 144 or other non-transitory processor-readable storage media that may store instructions in code for execution by the one or more processors 145. Memory 144 may also store information and may be coupled to processor (s) 145. Memory 144 may be consolidated in a single device or may include multiple memories/devices. Processor 145 may be coupled to one or more of the I/O devices 141, transmit processing circuitry 142, transmitter circuitry 143, receive processing circuitry 146, or receiver circuitry 147 and may provide control signals to such components, receive signals (e.g., parameters, settings, measurements, etc.) from such components, or both. Processor(s)145 may also be configured to perform various transmit processing functions, receive processing functions, or both, which may be implemented in executable code stored in memory 144. The above-discussed techniques may also be implemented by means of executable code stored in memory 144, which may be executed on processor(s) 145.

Figure 16:
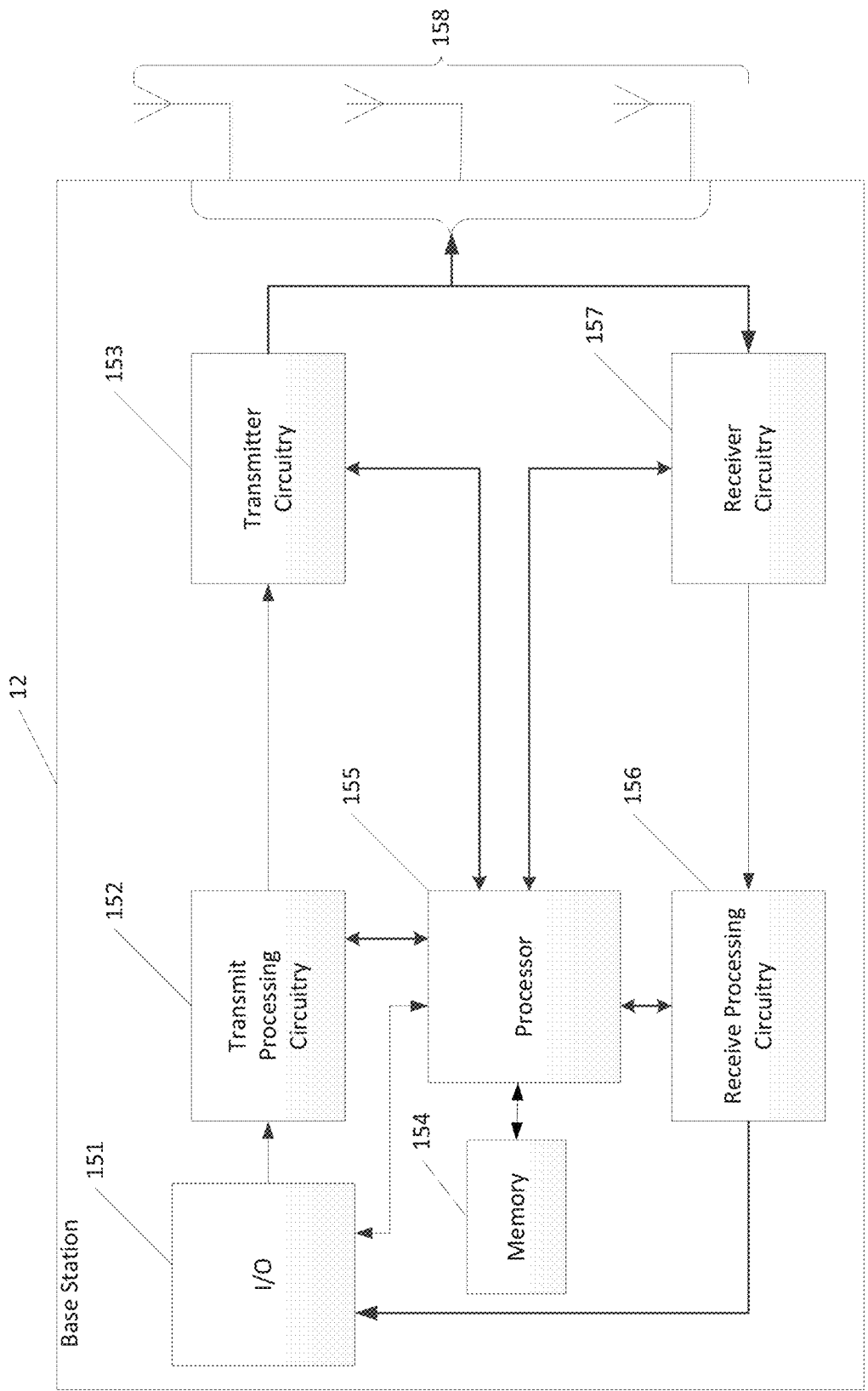

Similarly, FIG. 16 shows a conceptual block diagram of a possible implementation of a base station 12, to which the above concepts are not limited. The implementation of a base station 12 may be very similar to the implementation of a terminal 13. As shown in FIG. 16, base station 12 may include transmit processing circuitry 152 coupled to provide signals to be transmitted to transmitter circuitry 153. The transmit processing circuitry 152 may, for example, perform such operations as encoding and modulation, but is not thus limited. Data/information may be obtained, e.g., via input/output (I/O) devices 151, which may include, for example, one or more of a keypad, a keyboard, a mouse, a microphone (and may further be equipped with voice processing/encoding capabilities, such as sampling and encoding/decoding), a display, a speaker, a printer, or other such devices. I/O devices 151 may also be coupled to receive processing circuitry 156 and may obtain from receive processing circuitry 156 information that may be output. Receive processing circuitry 156 may, for example, perform such operations as decoding and demodulation but is not thus limited. Receive processing circuitry 156 may, in turn, be coupled to receiver circuitry 157. Transmitter circuitry 153 and receiver circuitry 157 may be coupled to one or more antennas 158. The transmitter circuitry 153 and receiver circuitry 157 may share antennas 158 or may be coupled to separate antennas or sets of antennas 158. Transmitter circuitry 153 may perform, for example, upconversion, amplification, etc., on signals to be transmitted over antennas 158. Receiver circuitry 157 may perform, for example, downconversion, filtering, amplification, etc., on signals received from antennas 158. Transmitter circuitry 153 may include multiple branches for multiple antennas or other parallel processing techniques. Similarly, receiver circuitry 157 may include multiple branches for multiple antennas or other processing techniques. The transmitter circuitry 153 and the receiver circuitry 157 may share circuitry or may be combined into a transceiver. Base station 12 may further include one or more processors 155, which may be microprocessors, central processing units, graphics processing units, processing cores, digital signal processors, or other types of computing devices, and may also include memory 154 or other non-transitory processor-readable storage media that may store executable code that may be executed by the one or more processors 155. Memory 154 may also store information and may be coupled to processor (s) 155. Memory 154 may be consolidated in a single device or may include multiple memories/devices. Processor 155 may be coupled to one or more of the I/O devices 151, transmit processing circuitry 152, transmitter circuitry 153, receive processing circuitry 156, or receiver circuitry 157 and may provide control signals to such components, receive signals (e.g., parameters, settings, measurements, etc.) from such components, or both. Processor(s)155 may also be configured to perform various transmit processing functions, receive processing functions, or both, which may be implemented in executable code stored in memory 154. The above-discussed techniques may also be implemented by means of executable code stored in memory 154, which may be executed on processor (s) 155.

While FIGS. 15 and 16 show the use of processors and memories, various other implementations of various functionalities performed by these components may, alternatively or additionally, be implemented in other ways, e.g., but not limited to, field-programmable gate arrays (FPGAs), look-up tables (LUTs), state machines, etc.

The antennas 148 and 158 shown in FIGS. 15 and 16 may be used to implement various types of signal transmission schemes, which may include, but are not limited to, multi-input/multi-output (MIMO), single-input/single-output (SISO), multiple-input/single-output (MISO), etc. Encoding and decoding may be implemented to accommodate precoding for such transmission schemes.

Additionally, executable code for implementing the above-described techniques may be downloaded to terminal 13, base station 12, or both. Such executable code may be stored and executed. Similarly, such executable code may be provided for download over a communication network.

The techniques described above may be applicable to various types of networks. Such networks may include, but are not necessarily limited to, one or more of the following: code-division multiple-access (CDMA) networks (e.g., IS-95, W-CDMA, etc.), Global System for Mobile Communications (GSM), $3^{rd}$ generation networks, such as those developed by the $3^{rd}$ Generation Partnership Project (3GPP), UMTS, UTRAN, E-UTRAN, long-term evolution (LTE), LTE-Advanced (LTE-A), Wi-Fi/IEEE 802.11, Zigbee®, Bluetooth®, etc.

When various functions are stated as being performed by "the network" or "network nodes," such functions may be performed by "base stations," control nodes, other network infrastructure elements, or combinations thereof, but not including "terminals," as used above.

Various techniques have now been discussed in detail; however, the disclosed concepts should not be understood as being limited to these techniques. It should also be appreciated that various modifications, adaptations, and alternatives may be made within the scope and spirit of this disclosure.

What is claimed is:

1. A method, comprising:
  receiving, by a mobile device, a signal indicating that a cell is a representative cell that is located at an edge of a coverage area of a carrier frequency of a network, wherein the signal indicates that the cell is a sector boundary cell;
  receiving, by the mobile device, a radial indication indicating a radial direction of the coverage area;
  determining a current location of the mobile device;
  based on the signal, the radial indication, and the current location, determining whether to perform measurements of the carrier frequency; and
  in response to determining to perform the measurements, performing the measurement of the carrier frequency with a decreased frequency of monitoring based on a decreasing signal strength of the carrier frequency.

2. The method of claim 1, further comprising:
  determining that the mobile device is in the coverage area based on the current location; and
  performing measurements of the carrier frequency.

3. The method of claim 2, further comprising:
  determining that the mobile device is located at the edge of the coverage area; and
  determining that a signal strength of the carrier frequency is below a predetermined threshold.

4. The method of claim 3, further comprising discontinuing measurements of the carrier frequency when the signal strength of the carrier frequency is determined to be below the predetermined threshold.

5. The method of claim 1, further comprising:
  determining that the mobile device is outside the coverage area based on the current location; and
  discontinuing measurements of the carrier frequency.

6. The method of claim 1, further comprising determining a direction of the mobile device based on the current location.

7. The method of claim 6, further comprising:
  determining an entry of the mobile device into the coverage area based on the current location; and
  performing measurements of the carrier frequency based on the entry.

8. The method of claim 6, further comprising:
  determining an exit of the mobile device from the coverage area based on the current location; and
  discontinuing measurements of the carrier frequency based on the exit.

9. A mobile device, comprising:
  one or more processors; and
  a non-transitory computer-readable storage medium coupled to the processor and storing programming instructions for execution by the processor, the programming instructions instruct the one or more processors to:
    receive a signal indicating that a cell is a representative cell that is located at an edge of a coverage area of a carrier frequency of a network, wherein the signal indicates that the cell is a sector boundary cell;
    receive a radial indication indicating a radial direction of the coverage area;
    determine a current location of the mobile device;
    based on the signal, the radial indication, and the current location, determine whether to perform measurements of the carrier frequency; and
    in response to determining to perform the measurements, perform the measurement of the carrier frequency with a decreased frequency of monitoring based on a decreasing signal strength of the carrier frequency.

10. The mobile device of claim 9, the programming instructions further instruct the one or more processors to:
  determine that the mobile device is in the coverage area based on the current location; and
  perform measurements of the carrier frequency.

11. The mobile device of claim 10, the programming instructions further instruct the one or more processors to:
  determine that the mobile device is located at an edge of the coverage area; and
  determine that a signal strength of the carrier frequency is below a predetermined threshold.

12. The mobile device of claim 11, the programming instructions further instruct the one or more processors to discontinue measurements of the carrier frequency when the signal strength of the carrier frequency is determined to be below the predetermined threshold.

13. The mobile device of claim 9, the programming instructions further instruct the one or more processors to:
  determine that the mobile device is outside the coverage area based on the current location; and
  discontinue measurements of the carrier frequency.

14. The mobile device of claim 9, the programming instructions further instruct the one or more processors to determine a direction of the mobile device based on the current location.

15. The mobile device of claim 14, the programming instructions further instruct the one or more processors to:
  determine an entry of the mobile device into the coverage area based on the current location; and
  perform measurements of the carrier frequency based on the entry.

16. The mobile device of claim 14, the programming instructions further instruct the one or more processors to:
  determine an exit of the mobile device from the coverage area based on the current location; and
  discontinue measurements of the carrier frequency based on the exit.

* * * * *